Sept. 18, 1934.   H. A. WADMAN   1,974,058
METHOD OF AND APPARATUS FOR ANNEALING GLASSWARE
Filed April 5, 1930   14 Sheets-Sheet 1

Sept. 18, 1934.   H. A. WADMAN   1,974,058
METHOD OF AND APPARATUS FOR ANNEALING GLASSWARE
Filed April 5, 1930   14 Sheets-Sheet 2

Witness:
W. B. Thayer

Inventor:
Harold A. Wadman
By Brown & Parkam
Attorneys

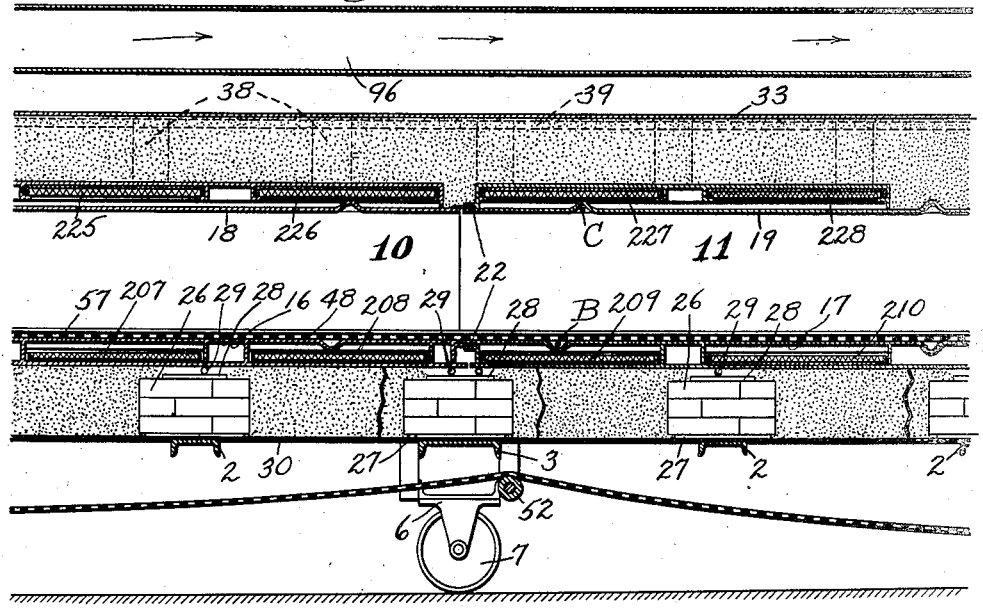
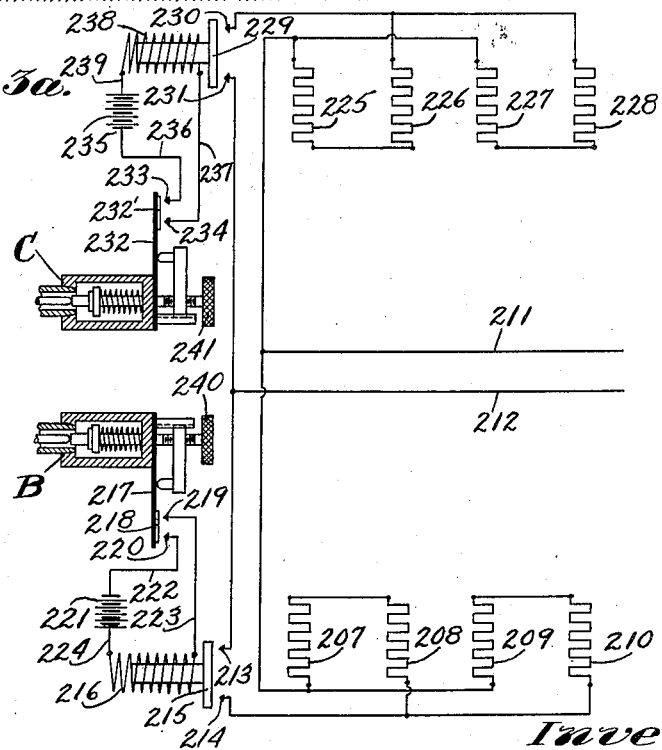

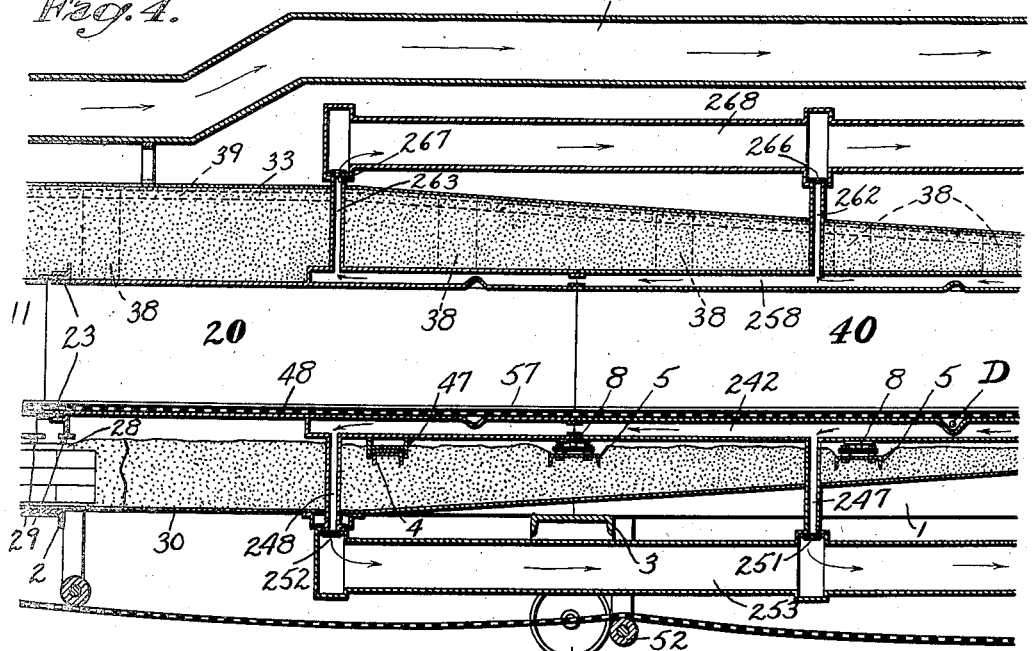
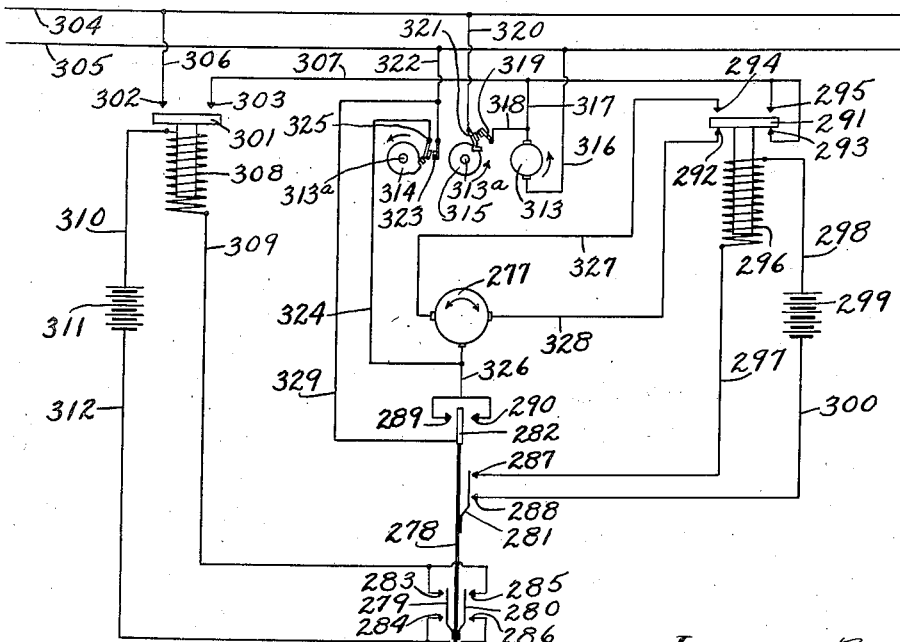

Sept. 18, 1934.  H. A. WADMAN  1,974,058
METHOD OF AND APPARATUS FOR ANNEALING GLASSWARE
Filed April 5, 1930  14 Sheets-Sheet 5
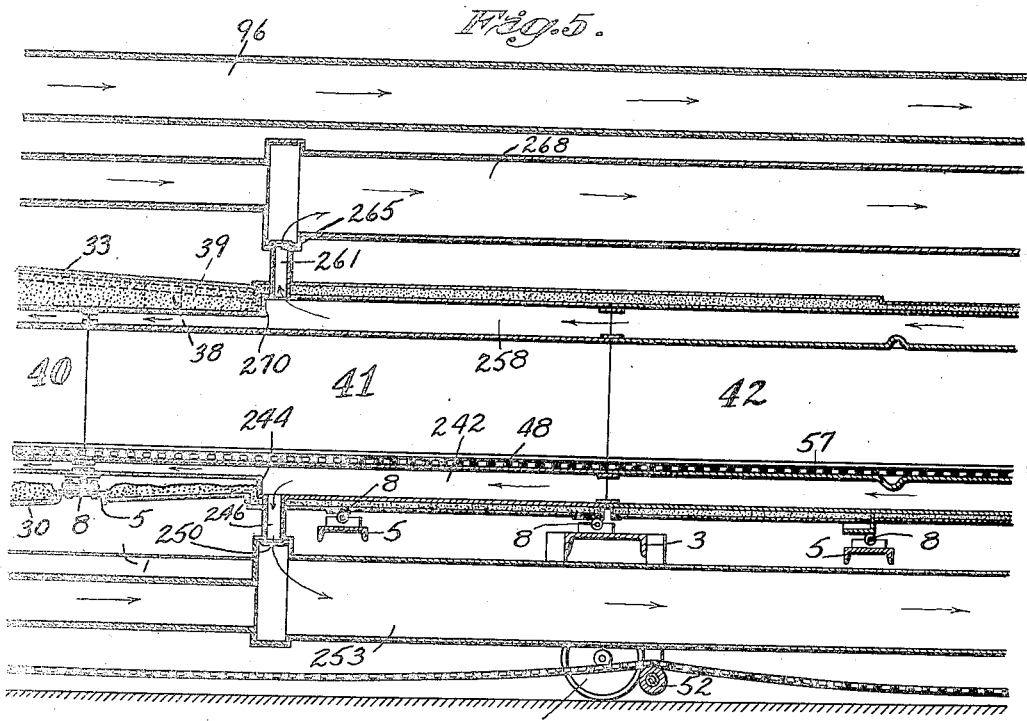
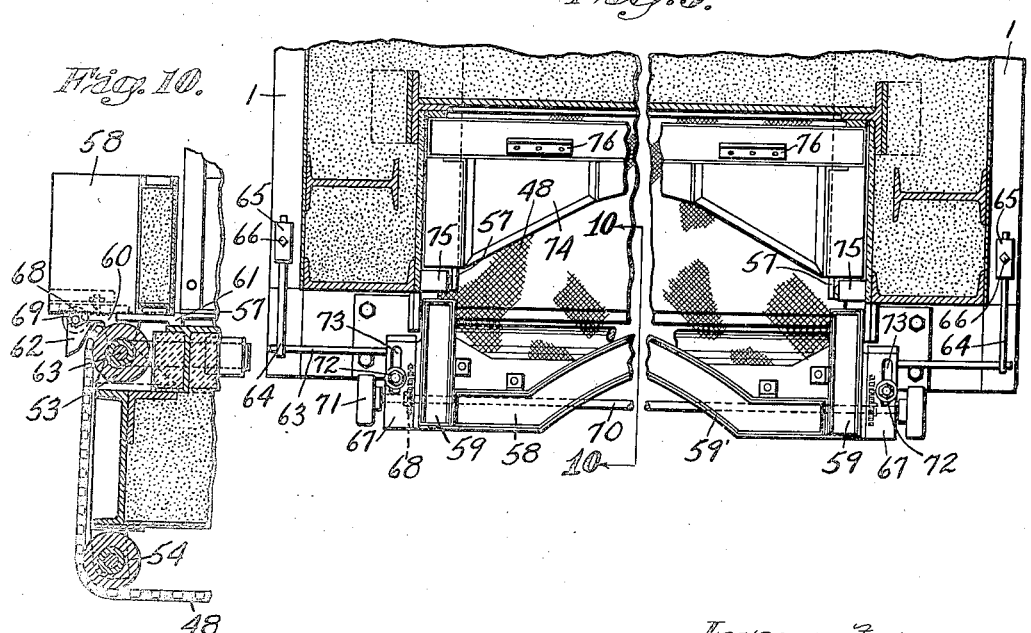
Witness:
W. B. Thayer
Inventor:
Harold A. Wadman
By Brown & Parham
Attorneys

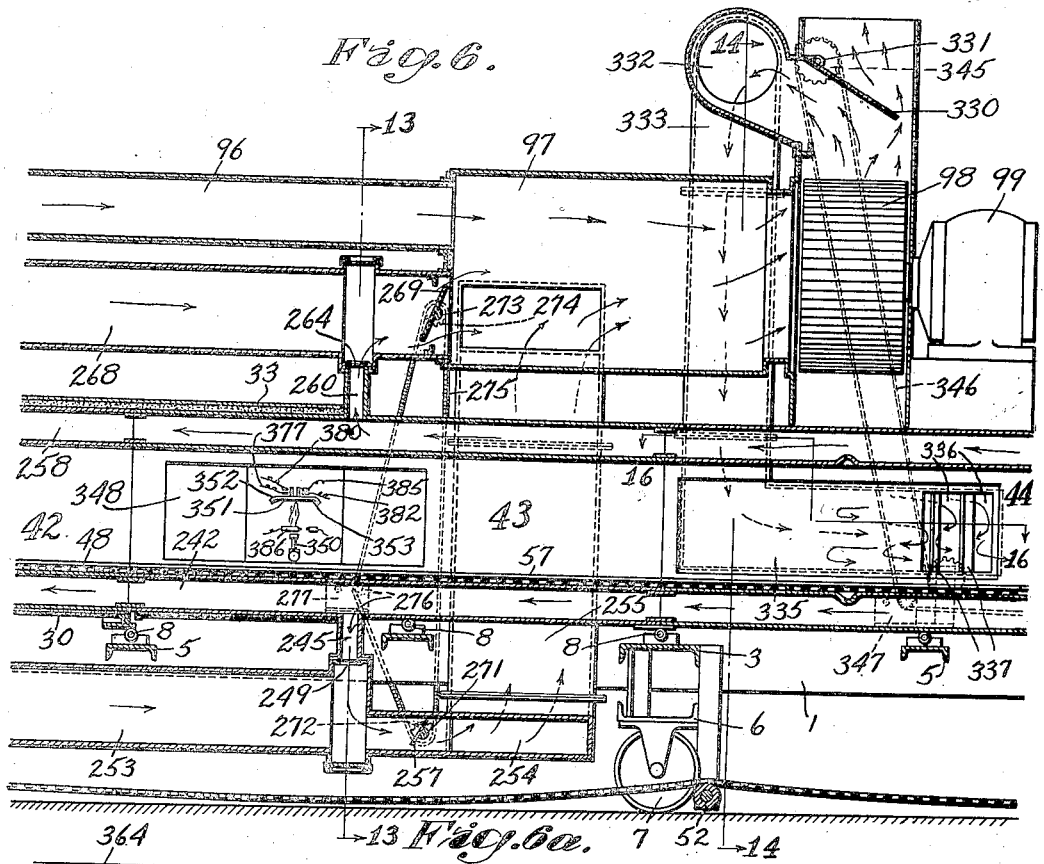
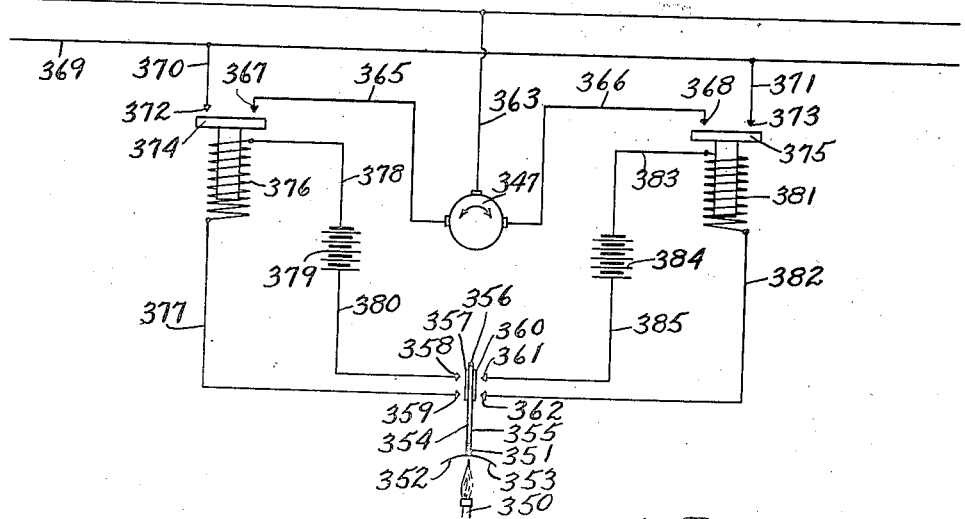

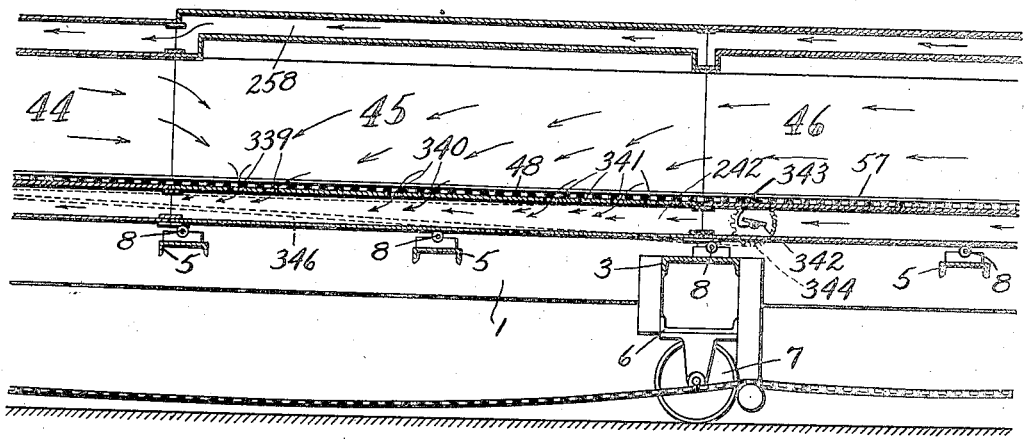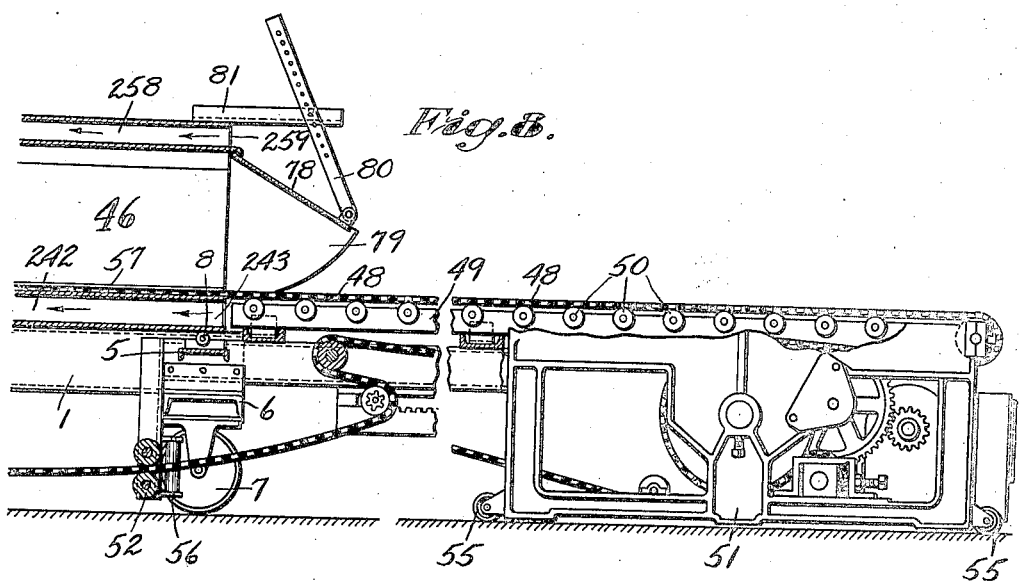

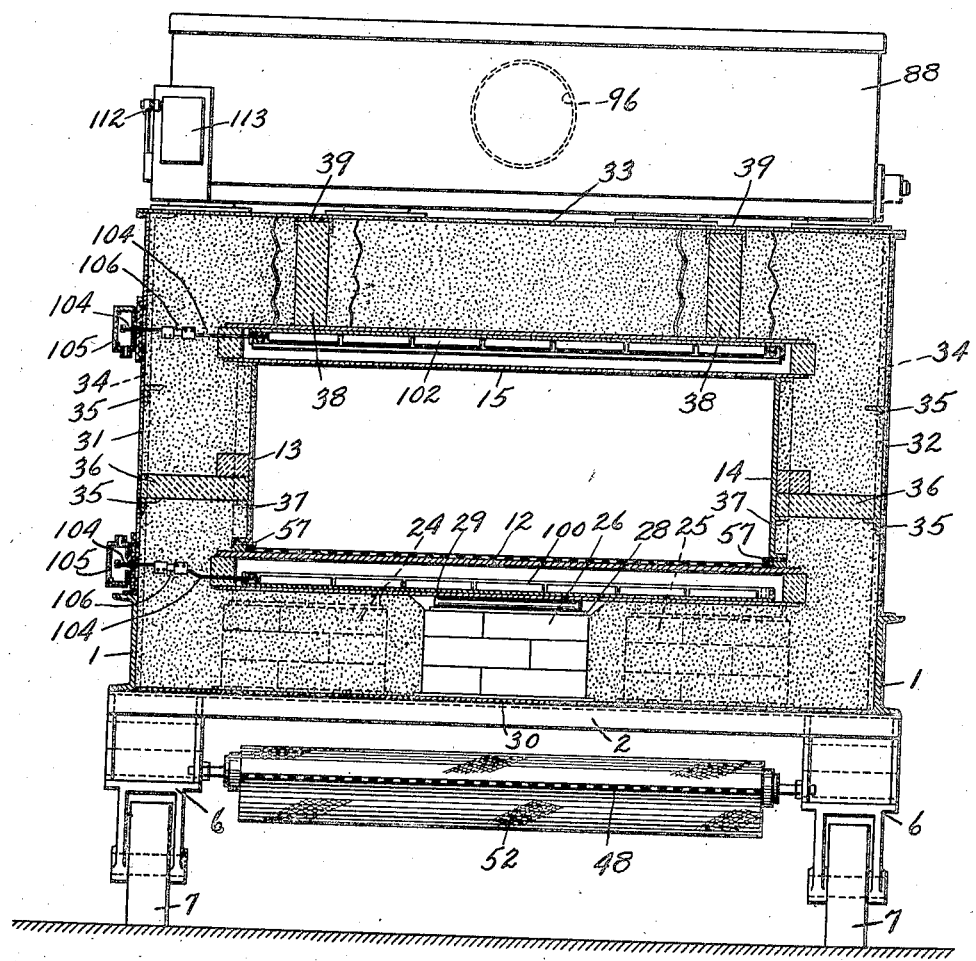

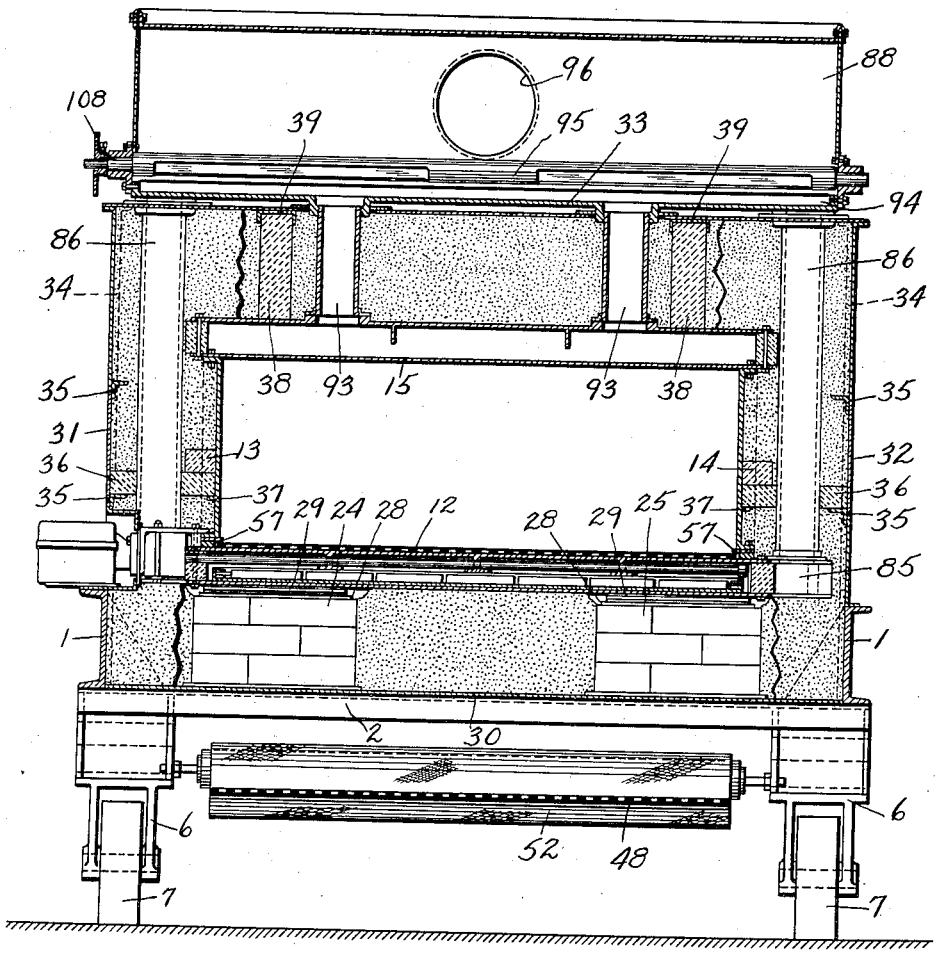

Sept. 18, 1934.   H. A. WADMAN   1,974,058
METHOD OF AND APPARATUS FOR ANNEALING GLASSWARE
Filed April 5, 1930   14 Sheets-Sheet 10
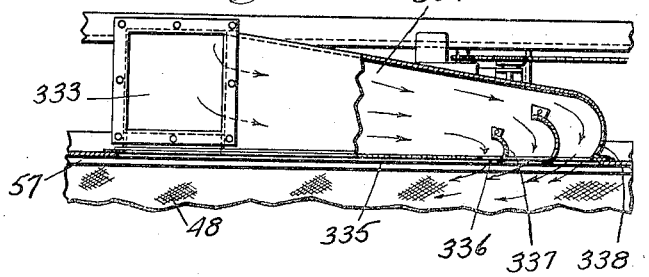
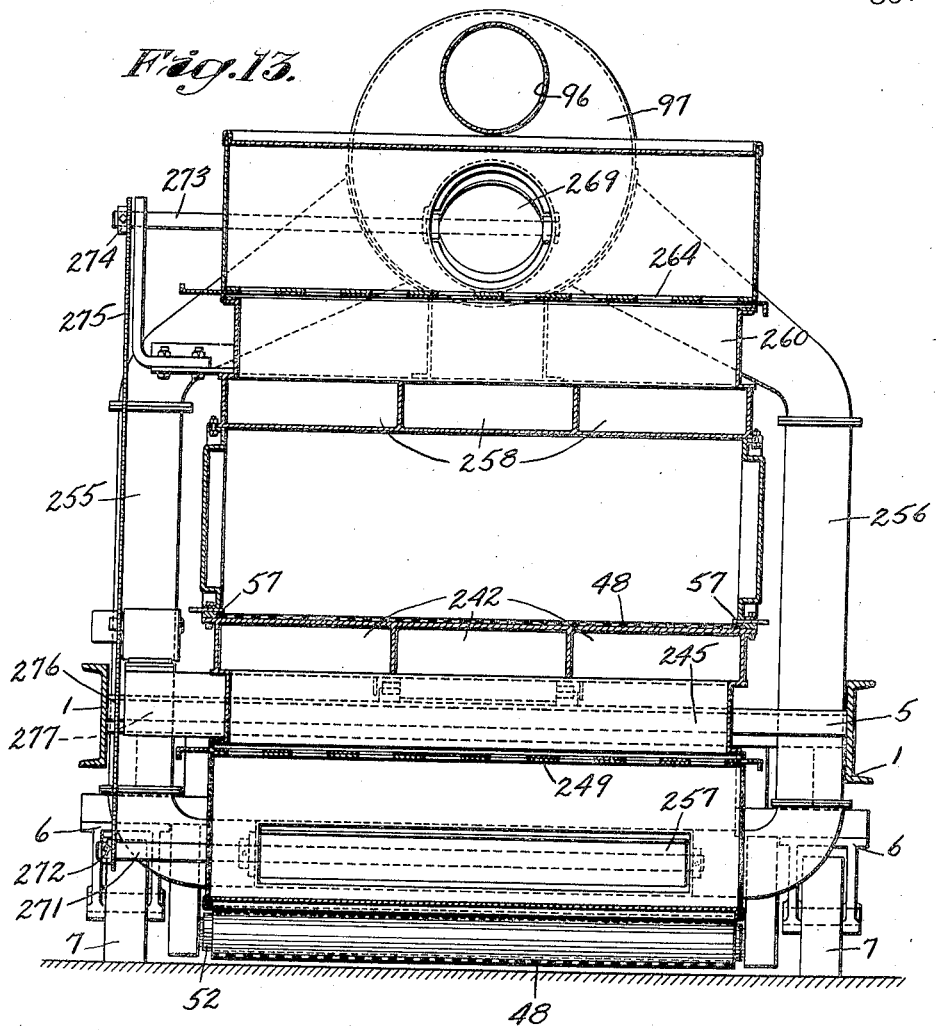
Witness;
W. B. Thayer
Inventor;
Harold A. Wadman
by Brown & Parham
Attorneys

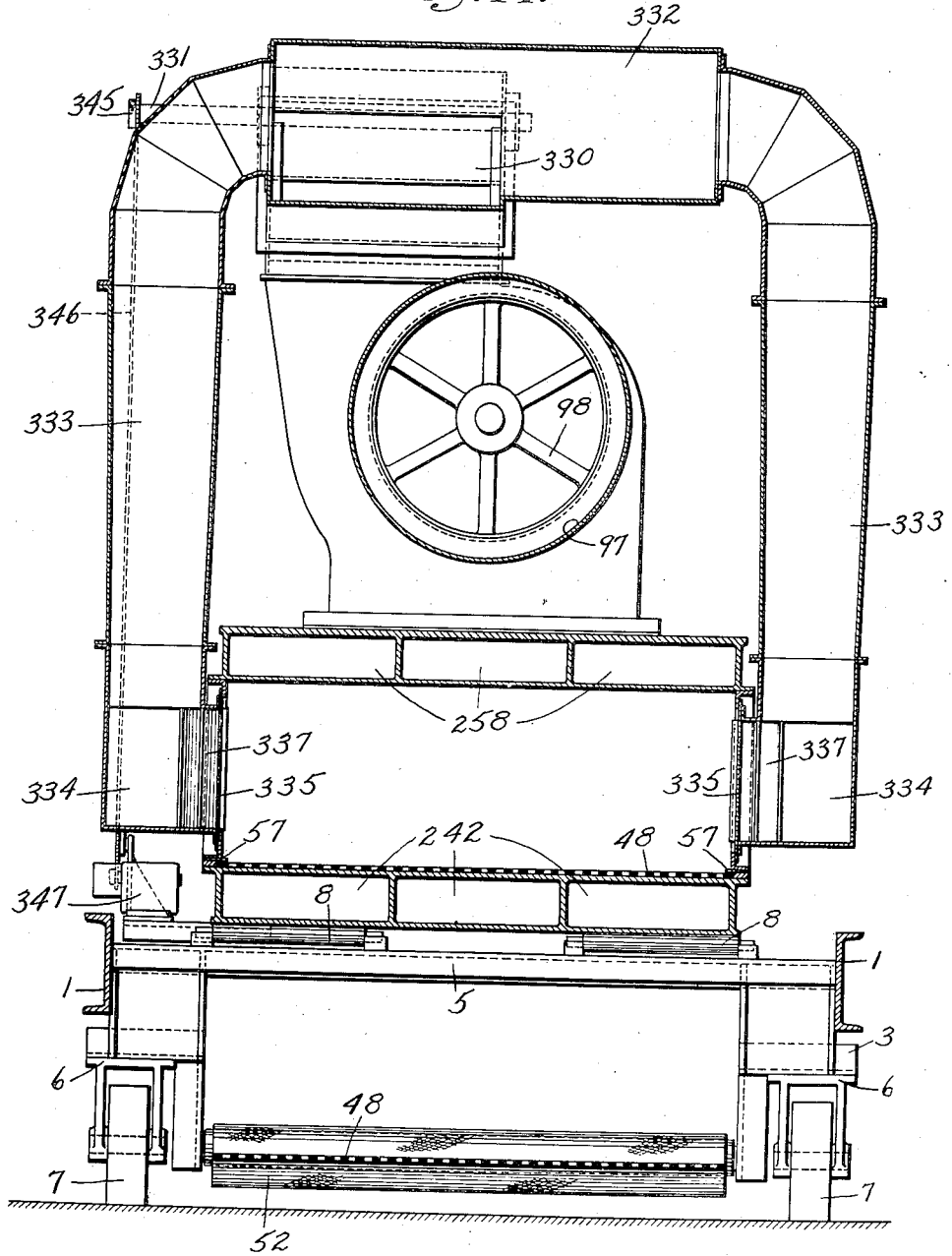

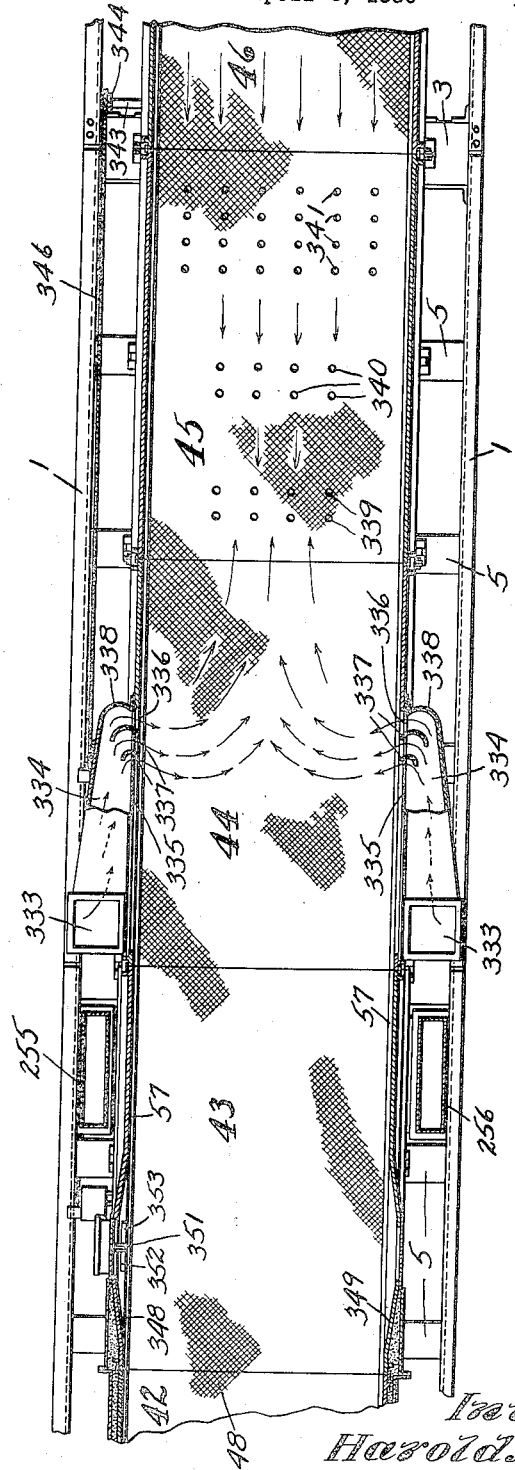

Sept. 18, 1934. H. A. WADMAN 1,974,058
METHOD OF AND APPARATUS FOR ANNEALING GLASSWARE
Filed April 5, 1930 14 Sheets-Sheet 13

Witness:
W. B. Thayer

Inventor:
Harold A. Wadman
by Brown & Parham
Attorneys

Sept. 18, 1934.   H. A. WADMAN   1,974,058
METHOD OF AND APPARATUS FOR ANNEALING GLASSWARE
Filed April 5, 1930   14 Sheets-Sheet 14

Witness;
W. B. Thayer

Inventor;
Harold A. Wadman
by Brown + Parker
Attorneys

Patented Sept. 18, 1934

1,974,058

UNITED STATES PATENT OFFICE 1,974,058

METHOD OF AND APPARATUS FOR ANNEALING GLASSWARE

Harold A. Wadman, Hartford, Conn., assignor to Hartford-Empire Company, Hartford, Conn., a corporation of Delaware Application April 5, 1930, Serial No. 441,793

16 Claims. (Cl. 49—47)

This invention relates to a method of and apparatus for annealing glassware and more particularly to an elongate tunnel lehr for accomplishing this purpose designed to be heated by electric heating means and designed for complete automatic control once properly installed and adjusted, and also to the various mechanisms for accomplishing such control and the methods of annealing glassware embodied in the lehr forming the subject matter of this invention.

The problem of annealing glassware in a continuous manner to meet the requirements of modern commercial manufacture involves many subsidiary requirements and presents numerous difficulties, which have only partially been solved in previous constructions and overcome but partially by previous methods.

A primary problem is that of preconditioning the ware as to temperature to bring it to a temperature desired in the lehr, irrespective of the temperature of such ware or the variations of the temperatures of various parts thereof when placed in the lehr. For example, it often happens in the case of articles having relatively heavy lower portions and relatively light upper portions, and also in some instance in articles all portions of which are of substantially the same thickness that the bottoms or lower portions of such articles may be hotter than the tops or upper portions thereof when placed in the lehr. It is usually desired in the annealing of glassware to bring all parts of the article to the same temperature and to maintain the same temperature gradient as to all parts of an article throughout the annealing process. In the accomplishment of this object means are provided by the present invention for pre-conditioning the ware as to temperature in order to bring all parts of all articles placed in the lehr to the same temperature and particularly to a predetermined desired temperature prior to the commencement of the annealing operations proper.

In carrying out this object it is necessary to abstract heat from the thicker portions or walls of an article at a rate faster than the rate of abstraction of heat from the thinner portions or walls thereof, inasmuch as the thicker portions of the article have a correspondingly greater heat content. Assuming two walls of substantially equal area, the rate of heat withdrawal required to keep the mean temperature in the two walls the same is proportional to the thickness of the walls. For example, in the case of hollow glass articles having relatively heavy bottoms and relatively light side walls, if the rate of abstraction of heat were the same for the bottoms and side walls, the side walls would be the first to rigidify due to the fact that their temperature would be reduced faster than that of the bottoms. The side walls are now rigid and the bottom still somewhat plastic, so that the further abstraction of heat will cause the bottom to rigidify, and thereafter further to contract. This will produce a tendency for the bottom to pull away from the side walls at the junction thereof, which will create a condition of strain in the article, which, if the rate of cooling be too great, will actually rupture the article at this point. If, however, the bottom be cooled at such a rate as to keep the mean temperature thereof always the same as the mean temperature of the side walls, specifically by abstracting heat therefrom at a rate greater than that of the abstraction of heat from the side walls substantially in proportion to the relative thickness of the bottom and side walls, all parts of the articles will freeze or rigidify at substantially the same time, which will positively prevent the presence of abnormal or secondary strains at the junction of these walls even at a relatively high rate of cooling.

This relative cooling may be carried on in the preconditioning portion of the lehr by introducing a vertical temperature gradient in this section, as will be hereinafter described, in order to provide for articles having walls of different thicknesses. The same or similar methods may and preferably also are used in the "soaking" and in the slow cooling portions of the lehr just beyond the "soaking" portion, presently to be referred to.

Among the objects of the present invention are, therefore, to provide a method of annealing articles of glass having walls of different means thicknesses, which consists in subjecting the walls of the articles to different temperature environments such that the rate of extraction of heat from the article is directly as the thickness of the wall, so that the mean temperature of the thicker walls remains equal to the mean temperature of the thinner walls throughout the annealing range, thereby permitting a degree of internal strain to be introduced throughout the thickness of the walls without introduction of secondary strains at wall junctions, and to further rapidly cool the articles approximately in accordance with the above, below the annealing range, thereby avoiding rupture of the articles at high rates of cooling.

A further and somewhat similar object of the present invention is the provision of a method of annealing glassware to adapt it for use for particular purposes in which the ware is annealed in such manner as to produce a peculiar condition of strain in the walls thereof, which render it more adaptable to such purposes. An example of such a use and of the characteristics of ware usable therefor is the manufacture of ware, particularly containers, designed for hot filling. It is desired that ware for this purpose be of such a character that the quick heating incident to the filling will not cause breakage of the ware. For this purpose it is desirable that the article be annealed in such a manner that the interior of the walls of the container be strained so as to tend to pull away from the exterior of the walls thereof. Such a condition can be produced by the cooling of the exterior wall portions of the ware at a rate greater than that of the cooling of the interior wall portions. Thus at an intermediate stage in the cooling, the exterior portions of the walls of the ware will be substantially rigid while the portions toward the interior of the said walls will still be somewhat plastic. As the interior of the walls later cools and rigidifies, it will tend to contract and thus tend to pull away from the exterior of the container walls, which will produce the condition of strain above referred to. When later such an article is filled with hot material, this material will first heat the interior portions of the walls of the ware, which will cause such portions to expand in advance of the exterior portions. This will tend to make the interior portions expand and push against the exterior portions which is exactly the opposite tendency from that due to the permanent strain left in the ware when cool, and will tend to bring the article back toward a position of zero strain and thus tend to minimize breakage of articles due to such hot filling. Likewise the lower portions of articles subjected to hot filling will be heated sooner than the upper portions with analogous results. Among the objects of the invention are therefore to provide a lehr and a method of using such lehr in which it is possible to so cool the articles as to leave therein a condition of strain of the above described and other selected characters, which will oppose strains incurred by the articles in later use.

After the ware has been brought to a particular desired temperature, which in the usual case is that at which it is desired to hold the ware for the release of permanent strains, the ware is preferably maintained at such temperature for a period of time necessary for the permanent strains to work out of the articles. It has been found that this period, which is usually known as the "soaking" period, is of shorter duration the higher the temperature is maintained, and vice versa, of longer duration when a lower "soaking" temperature is chosen.

The next step in the process of annealing is gradually to reduce the temperature of the ware from the high or "soaking" temperature to a point below which permanent strains cannot be reintroduced into the ware. If a high "soaking" temperature is chosen, the period of slow cooling must be correspondingly increased, as the "low annealing point", or the point below which permanent strains may not be introduced into the ware, is substantially a particular temperature or small range of temperatures for any particular article or class of articles and depends chiefly upon the composition of the glass. For this reason, the time and temperature of "soaking" are chosen with respect to the time necessary to decrease the temperature of the ware to the low annealing point, so that the total of these time periods is substantially minimized. It will be understood that the rate of the reduction of temperature of the ware from the high annealing point or "soaking" temperature to the low annealing point is definitely limited by the rate at which heat may be removed from the ware while preventing permanent strains from being reintroduced thereinto during this slow cooling period.

A further object of the invention is therefore to provide a lehr in which the rate of cooling or the abstracting of heat from the ware between the high annealing or the "soaking" temperature and the low annealing temperature above referred to may be controlled within narrow limits in order to accomplish the best annealing, having in view the above mentioned requirements.

From the low annealing temperature down to room temperature, permanent strains may not be reintroduced into the ware, so that a faster rate of cooling may be employed without regard to the reintroduction of permanent strains. This rate is, however, limited by the presence of temporary strains introduced by this cooling, which, if the rate be too high, will disrupt the ware at the time, resulting in broken ware emerging from the lehr. It is necessary, therefore, properly to control the rate of cooling, which is a rapid cooling in this range, in order not to cause the breakage of ware in cooling it between the low annealing point and room temperature.

It has been found that to achieve the greatest efficiency in the operation of tunnel lehrs of the muffle type, it is desirable to minimize and prevent as far as possible stray air currents in the hotter portions of the tunnel, which in practice interfere with the accurate control of the temperature gradient in the ware, and as a result are likely to cause poor annealing. For this purpose special means are provided for controlling and minimizing "drift", as the stray air currents are called, whereby to provide the optimum conditions for annealing, the provision of such drift control means and the method of annealing glassware including the use of these or equivalent means being further objects of the present invention.

Furthermore, in lehrs of this and related character, as well as in other heated mechanism, it is desirable from the point of view of economy to prevent as far as possible the loss of heat to the surroundings from the heated portions of the mechanism; and an object of the construction of the lehr embodied in this application is the provision of such means. In furtherance of this object, it is a further and more specific object to provide a means at the entrance end of the tunnel for preventing loss of heat from the interior thereof and from articles within the entrance end of the tunnel to the surroundings, such means taking the form of gate members, closing as far as practicable the entrance end of the tunnel. A somewhat similar consideration prompts the use of a gate member for constricting the exit end of the lehr.

Turning now to the more specific objects, it is an object of the present invention to provide a front gate structure constituting an improvement on that shown in the reissue patent to Hartford-Empire Co., assignee of Vergil Mulholland, Re. 17,263, reissued April 9, 1929, and specifically to provide a means for adjusting the upper and lower gate members, and a means for swinging the lower gate member outwardly to provide access to the interior of the tunnel.

A further specific object of the invention is to provide means positioned in the tunnel adjacent to the entrance end thereof alternatively to supply heat to or abstract heat from the ware on the conveying means, this subject matter being an improvement on that disclosed in the patent to Hartford-Empire Co., assignee of George E. Howard, No. 1,618,660, patented Feb. 22, 1927, reissued May 20, 1930, Re. 17,669 the present invention embodying both structural and functional improvements over the disclosure of the Howard patent and reissued and certain methods also constituting improvements over the methods disclosed by Howard.

A further specific object of the invention is to provide automatic means for controlling the means referred to in the preceding paragraph so as to insure the desired temperature conditioning of the glass. This means is in some respects similar to that embodied in my copending application, Serial No. 368,531, filed June 5, 1929, now Patent No. 1,802,991, granted April 28, 1931, and as to this subject matter, the present application is a continuation of my said copending application.

A further specific object of the present invention is the provision of longitudinally extending cooling flues both above and below the tunnel through which the glassware is passed for annealing, and the provision of means for controlling the total drafts through these flues simultaneously and also differentially. In connection with this control and also in connection with the automatic control for the preconditioning zone above referred to in connection with my copending application, Serial No. 368,531, now Patent 1,802,991 it is a further object of the present invention to provide a means, preferably electrical, for rendering the automatic corrections in response to the temperature of the ware of an intermittent character in response to small variations between the temperature of the ware and that desired, and continuous when and as long as these variations are of relatively greater magnitude.

A further object of the invention is to provide certain improvements in the combined drift controlling and cooling means for the exit end portion of the tunnel over and above those disclosed in another of my copending applications, Serial No. 389,118, filed August 29, 1929 now Patent No. 1,808,192, granted June 2, 1931. As to this subject matter, the present application is a continuation of this copending application.

Further objects and advantages of the present invention will be apparent from a reading of the following specification and sub-joined claims when taken in connection with the accompanying drawings, in which:

Figure 2:
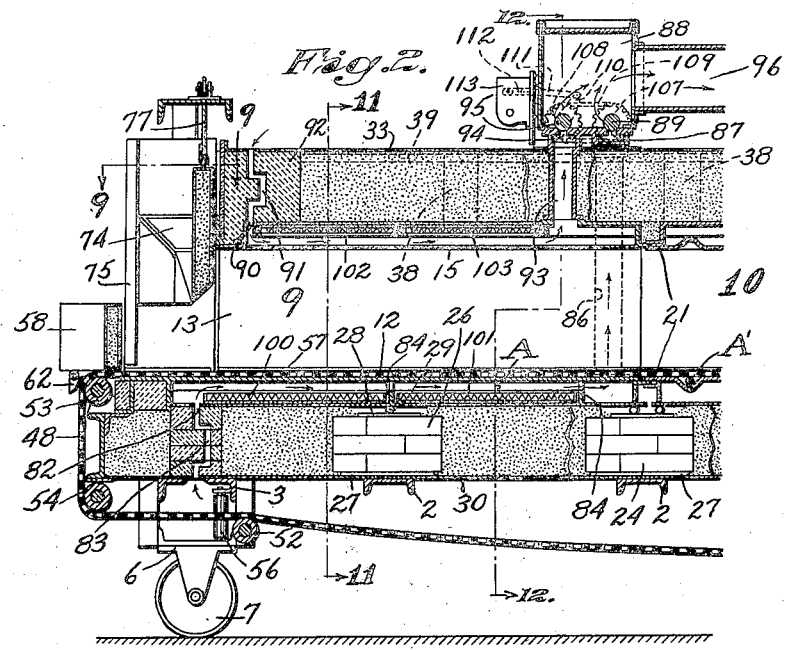
Figure 2A:
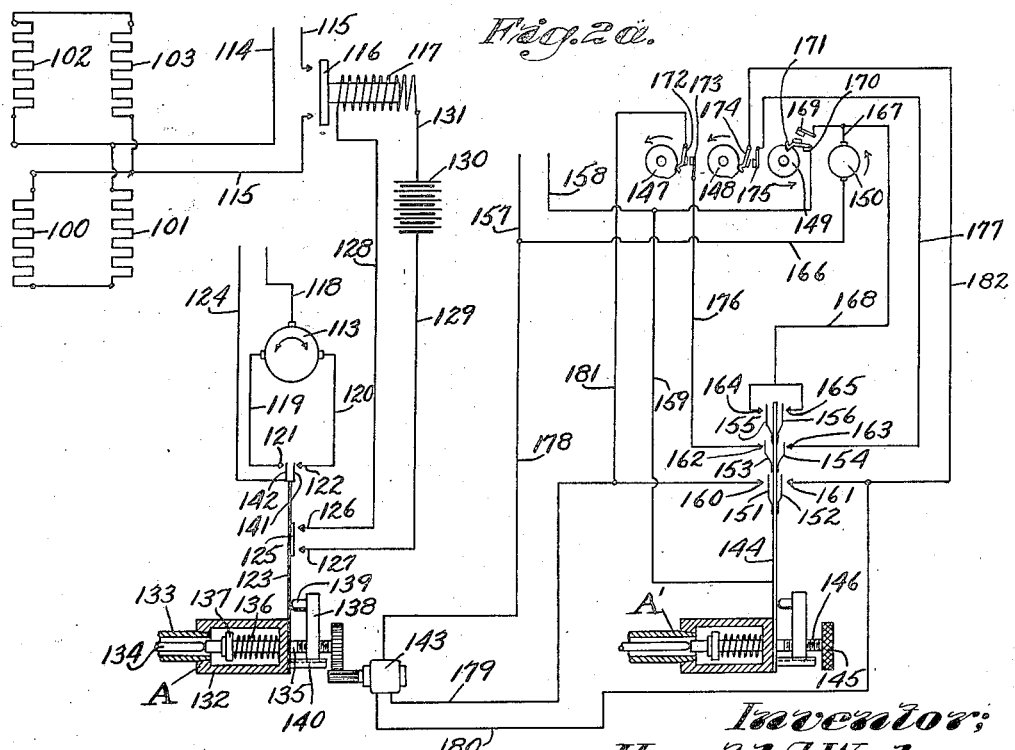
Figure 17:
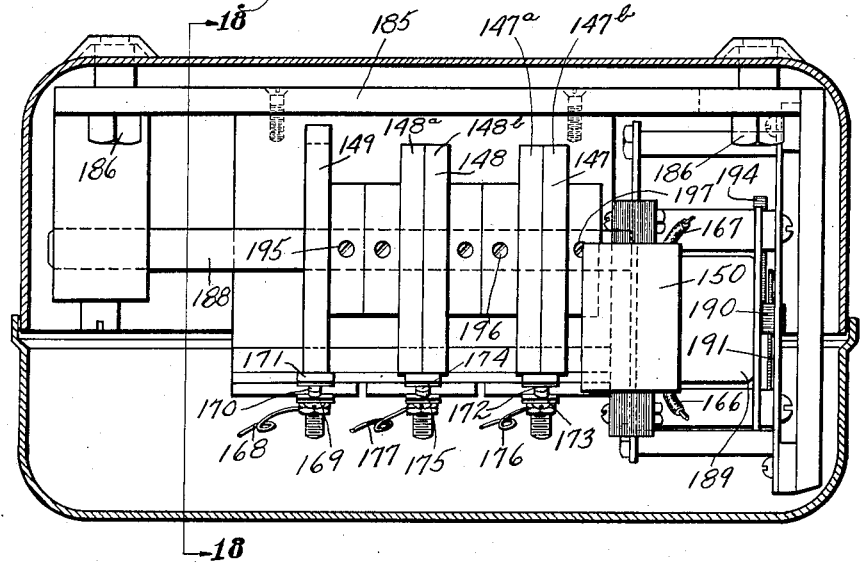
Figure 18:
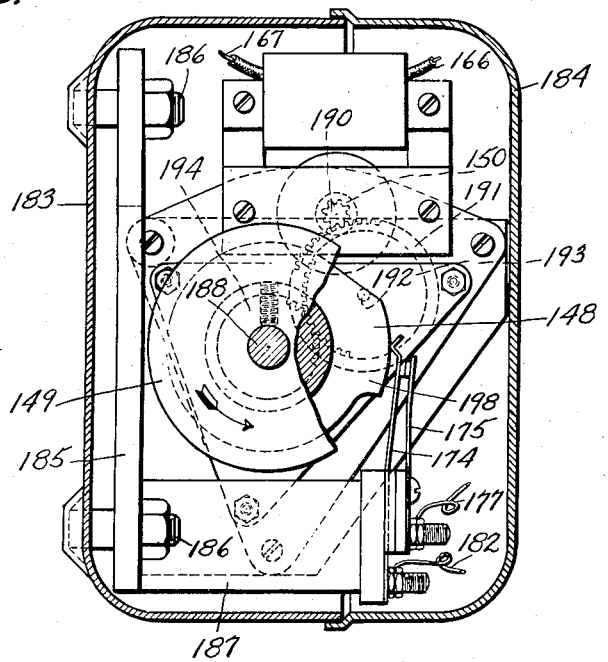
Figure 19:
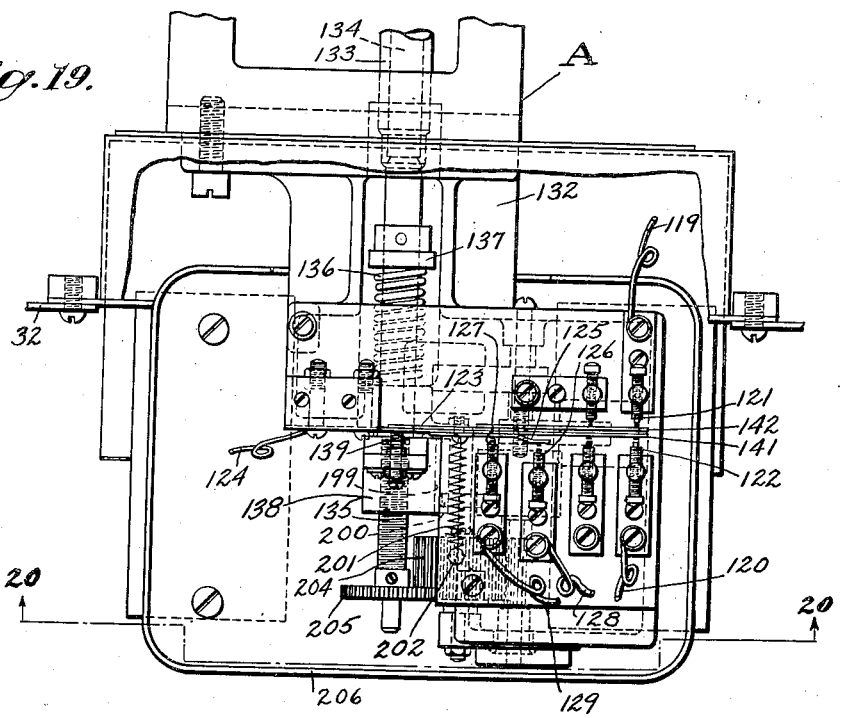
Figure 20:
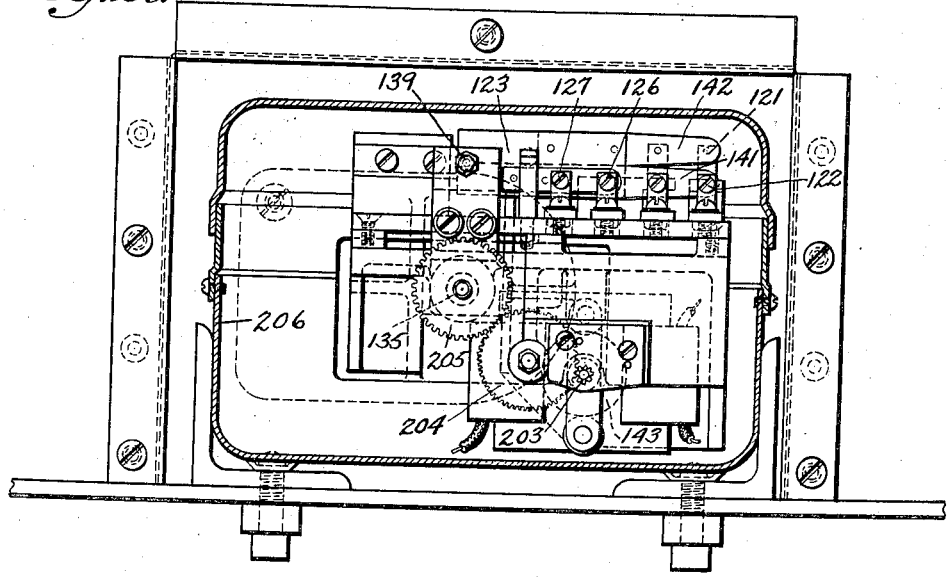

Figs. 2 to 8 inclusive together constitute a vertical longitudinal center section of the lehr, it being understood that these figures are adapted when placed end to end to constitute but a single detail showing of the entire mechanism;

Fig. 2a is a diagrammatic representation of electric circuits usable in the control of the mechanism illustrated in Fig. 2, the circuits having been simplified for ease of illustration and understanding;

Fig. 3a is a diagrammatic representation of the control circuits and the main heating elements for supplying heat to the lehr;

Fig. 4a is a diagrammatic representation of electric circuits and associated mechanism usable to control the rate of cooling in the cooling portion of the lehr tunnel, the circuits having been simplified as in the case of those shown in Fig. 2a;

Fig. 6a is a diagrammatic representation of the drift control circuits and associated mechanism, similar simplification of the circuits having been made to the other circuits shown;

Fig. 9 is a fragmentary horizontal section of a portion of the lehr taken substantially on the line 9—9 in Fig. 2 in the direction of the arrows;

Fig. 10 is a fragmentary vertical section of the lower front gate and adjacent parts taken substantially on the line 10—10 in Fig. 9 in the direction of the arrows;

Fig. 11 is a transverse section of the lehr substantially on the line 11—11 in Fig. 2 in the direction of the arrows;

Fig. 12 is a two-part vertical transverse section of the lehr taken substantially on the broken line 12—12 in Fig. 2 in the direction of the arrows, but with some of the insulating material broken away to show certain parts in full elevation;

Fig. 13 is a transverse vertical section of the lehr taken substantially on the line 13—13 of Fig. 6 in the direction of the arrows;

Fig. 14 is a transverse vertical section of the lehr taken substantially on the line 14—14 of Fig. 6 in the direction of the arrows;

Fig. 15 is a fragmentary horizontal section of a portion of the lehr showing the direction of air flow incident to drift control, the view being taken substantially midway between the top and bottom of the tunnel and including the portions of the lehr shown in Figs. 6 and 7;

Fig. 16 is a fragmentary horizontal section of a portion of the air inlet means for drift control purposes, the view being taken substantially on the broken line 16—16 in Fig. 6 in the direction of the arrows;

Fig. 17 is a plan view of the cam mechanism for the electric circuit shown in Fig. 2a, the box enclosing such mechanism being shown in section;

Fig. 18 is a vertical section taken substantially on the line 18—18 in Fig. 17 in the direction of the arrows;

Fig. 19 is a plan view of a portion of the thermostat, automatic range adjusting means, and contact mechanism shown at the lower left-hand portion of the wiring diagram, Fig. 2a; and Fig. 20 is an elevation of the mechanism shown in Fig. 19, the casing being shown in section and the view being taken substantially on the line 20—20 in Fig. 19 in the direction of the arrows.

Figure 1:
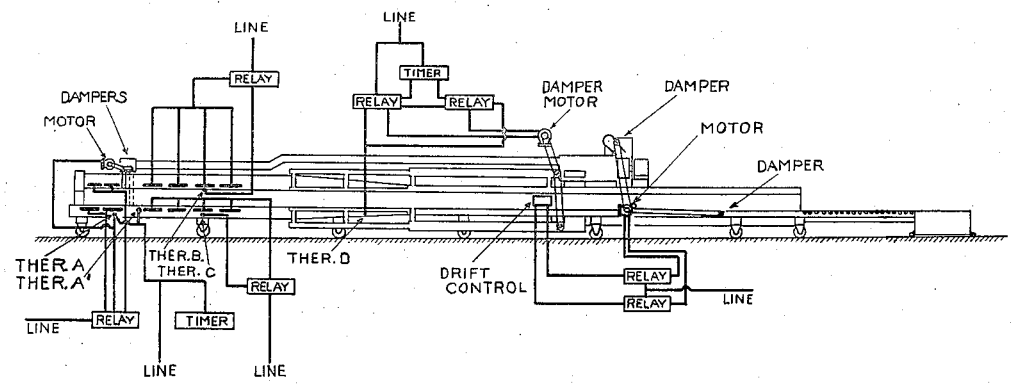
Figure 1 is a diagrammatic illustration of the entire lehr showing the relative positions of the heating and cooling means and the various automatic controls for heating, cooling and drift regulation.

For convenience of description, I have shown in Fig. 1 a diagrammatic illustration of the entire lehr on which are certain legends showing the relative arrangement and positioning of the various electrical and mechanical mechanisms forming a part of the lehr as a whole and the control means therefor, the details of which are shown on the remaining figures.

Figure 1A:
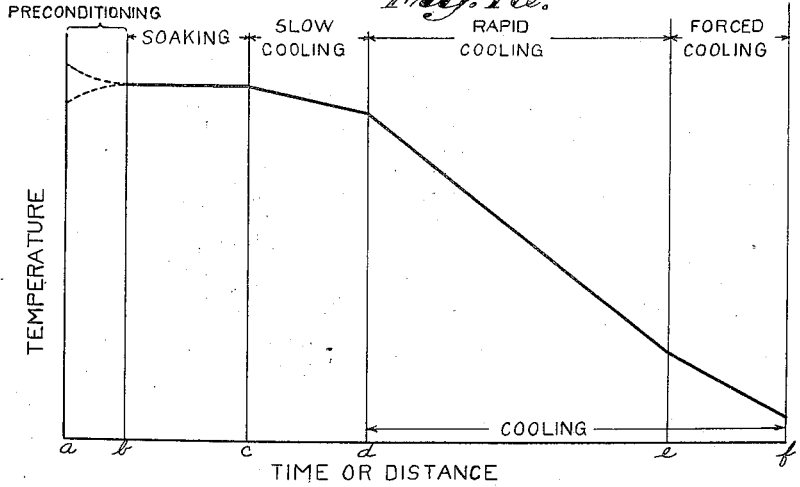
Fig. 1a is a possible temperature curve for the ware along the length of the lehr to approximately the same scale as Fig. 1 and showing the operations incident to the annuealing in the several parts of the lehr.

Fig. 1a is a characteristic temperature curve drawn substantially on the same scale as Fig. 1, to illustrate a temperature gradient for glassware, which may be produced by a lehr of the character hereinafter to be specifically described. This temperature curve may be divided into several sections as illustrated and includes an initial range between the points a and b, which serves for preconditioning the glass. As illustrated, the glass may arrive at the lehr either too hot or too cold, or some portions of the ware may be hotter than others. In any case it is necessary to bring all portions of the ware to the same temperature, which in the instant case is preferably the "soaking" temperature. The second zone in the curve may be considered that from points b to c, which may be a "soaking" range, and in which the glassware may be held at a predetermined high temperature for the release of permanent strains, the duration of the "soaking" period being predetermined and corresponding to the time necessary for glass to move from points b to c. The zone from c to d may be considered the slow cooling zone, during which time the temperature of the ware is reduced from the "soaking" temperature substantially to the "low annealing temperature" or that below which permanent strains cannot be reintroduced into the ware, which for the purposes of illustration may be considered to be at the point d. While the glass is passing through this slow cooling zone, the rate of cooling is maintained such that permanent strains will not be reintroduced into the ware. The zone from d to f may be considered the cooling zone, during which period the glass temperature is reduced from the low annealing temperature at or near the point d to substantially room temperature, or at least to a temperature at which it is possible to handle the ware for packing it. As illustrated in Fig. 1a, this zone is divided into two zones designated "rapid cooling" and "forced cooling" from d to e and e to f respectively. This is brought about by the practical considerations that a means for accomplishing the rapid cooling, which in the present instance comprise muffle flues extending longitudinally of the tunnel, become less effective adjacent to the exit end of the lehr. At this point the temperature in the ware more closely approaches room temperature and there is a correspondingly lower temperature difference between the cooling medium (atmospheric air) and the glassware, so that a forced cooling is preferably used and in the present instance includes the passing the atmospheric air directly around and between the articles in order to provide the greatest temperature difference possible and add to the radiation cooling the effect due to the convection of the rapidly moving air, thus to accomplish the cooling in the minimum of time. Due consideration must be and is given to the establishing of the minimum possible time of cooling, and yet at rates not sufficient to cause breakage of the ware due to excessive temporary strains which are introduced into the ware in cooling it. That is, the forced cooling zone can only be extended a predetermined distance from the exit end of the lehr, such distance being determined by experiment.

For convenience in description, the present disclosure is divided into five main sections:

I. The general construction of the lehr together with the structure of the mechanism which goes to make up the tunnel per se and supports therefor, the ware conveying means, and certain appurtenant mechanism.

II. The front end alternative heating or cooling arrangements and the automatic controls therefor.

III. The main heating provisions for the lehr and the automatic controls therefor.

IV. The cooling system for the lehr including the means by which the cooling is effected and automatically controlled.

V. The drift controlling means and the automatic mechanisms used in carrying out such control, which means also makes possible the forced cooling of the ware.

These several groups will be taken up in order.

I—GENERAL CONSTRUCTION

*Frame work and supports*

The lehr of this application is shown as being built up from a structural steel frame work including a pair of longitudinally extending channel members 1 at each side thereof which are tied together by a plurality of cross channels 2, 3, 4 and 5, preferably welded thereto. The cross channels 2 are disposed in the hotter region of the tunnel and serve to support the inner tunnel, as will be hereinafter described, as well as to tie the channels 1 together. The channels 3 are disposed at joints of the members 1, as a plurality of channels 1 are used to extend the length of the lehr, which are supported at their joints upon cross channels 3 and these in turn are provided with brackets 6, bearing wheels 7 by which the movement of the lehr as a whole is facilitated, the channels 1 being preferably bolted or otherwise suitably secured together in end-to-end relation at each side of the lehr. The cross channel 4 (Fig. 4) is provided as an anchoring channel for the cooling portion of the lehr tunnel in a manner hereinafter to be described in detail. The channels 5 are used to support the cooling portion of the lehr tunnel and are provided with suitable rollers 8 received in suitably shaped brackets upon which this portion of the tunnel is supported, similar rollers 8 being provided above the cross channels 3 in this portion of the tunnel for the same purpose. The construction and mode of operation of this support and of the rollers 8 and the bearings therefor will be obvious from an examination of Figs. 5 to 8, inclusive, and 14.

Inasmuch as the supporting structure above described is relatively cool at all times, no particular expansion provisions are made in connection therewith, but any expansion which may occur, is taken care of by the rollers 7 travelling upon the floor on which the lehr may be mounted.

*Tunnel construction in heated zone*

The construction of the tunnel and the supports therefor in the heated zone are preferably similar in many respects to the subject matter disclosed in the copending joint application of myself and one A. W. Russell, Serial No. 239,874, filed December 14, 1927 now Patent 1,827,673, granted Oct. 13, 1931. In the embodiment illustrated in the accompanying drawings is shown an inner tunnel built up of a plurality of sections arranged in end-to-end relation, and in which each section is independently expansible and is supported by a peculiar and novel supporting structure through the interposition of heat insulating material, so that in this portion at least of the tunnel, there are no metallic inter-connections between the inner tunnel and the outer casing intermediate the ends of this heating portion by which heat may be lost from the inner tunnel to the surroundings.

As shown in Figs. 2, 3, 4, 11 and 12, I preferably employ three such tunnel sections 9, 10 and 11, although a greater or less number may obviously be used. Section 9, the first section, comprises a metallic bottom member 12, metallic side members 13 and 14, and a metallic top member 15. The side members comprise plates which are preferably bolted to the bottom and top members 12 and 15 respectively, although any other means of fastening may, if desired, be used. Sections 10 and 11 (Figs. 3 and 4) similarly comprise metallic bottom members 16 and 17 respectively, metallic side members similar to members 13 and 14, and metallic top members 18 and 19 respectively, the component members of sections 10 and 11 being secured together in the same or similar manner as the component members of section 9.

Means are provided intermediate the contiguous ends of tunnel sections 9, 10 and 11 and intermediate the end of section 11 with the contiguous section 20 for permitting independent expansion of the tunnel sections 9, 10 and 11. That is, these tunnel sections are not rigidly secured together, but are provided with overlapping flange members as shown in detail in Figs. 2, 3 and 4, at 21, 22 and 23 respectively, whereby each of the sections 9, 10 and 11, may expand independently of either of the others and independently of the tunnel section 20 contiguous with section 11.

Sections 9, 10 and 11 are supported in a manner somewhat similar to the joint copending application of myself and Russell above referred to, now Patent 1,827,673 upon spaced piers of insulating material, such as insulating bricks, which are disposed as shown in a manner in which there are two transversely spaced piers 24 and 25 (Fig. 12), at each of the joints 21, 22 and 23 supporting the ends of contiguous tunnel sections 9-10, 10-11, and 11-20 respectively. Each of the tunnel sections 9, 10 and 11 is further preferably provided with a centrally disposed pier 26 for furnishing additional support. Each pier 24, 25 and 26 comprises one or more heat insulating bricks or blocks of suitable strength to furnish the necessary support of the several tunnel sections, the piers being supported respectively upon metallic plates 27 disposed over the cross channels 2 or 3 as the case may be. The piers are provided at their upper ends with horizontally disposed metallic plates 28 upon which rest transversely extending rollers 29, the rollers in turn supporting the tunnel sections 9, 10 and 11, thus providing for the longitudinal expansive movement of the tunnel sections with respect to the supporting piers 24, 25 and 26.

The tunnel sections 9, 10 and 11 and certain of the subsequent sections, as 20, are surrounded by an outer casing including a bottom 30, sides 31 and 32, and a top 33. This outer casing is preferably made up of a plurality of sheet metal plates, the edges of which are outwardly flanged and bolted together by suitable bolts at a distance from the bend of the flanges, whereby any expansion which may occur in the casing as a whole will be taken up in the pulling away of the plate sections from each other provided for by the width of the flanges and the distance between the points of connection of the flanges and the bends thereof. The bottom 30 of the outer casing is supported as shown upon the spaced cross channels 2 and 3 in the heated zone. The side members 31 and 32 of the outer casing in the heated zone are preferably supported upon a strap metal framework shown in Figs. 11 and 12, partly in dotted lines at 34 and including vertical and horizontal metallic members, which are rigidly secured to the side channels 1 by bolts or in any other suitable manner (not shown). This framework or the sides 31 and 32 of the casing have affixed thereto longitudinally extending angles 35 for the joint purpose of strengthening the supporting frame work 34 and assisting in rigidifying the structure generally and of supporting spacing blocks 36 of heat insulating material extending between the side members 31 and 32 of the casing and the sides of the tunnel as clearly illustrated in Figs. 11 and 12, the blocks 36 being supported at their inner ends by suitable bracket members 37 formed integral with or attached to the side members of the tunnel. The spacing bricks 36 are unattached either to the sides of the tunnel or to the outer casing, whereby to permit relative expansive movement of these parts.

The roof or top section 33 of the outer casing in the heated portion of the tunnel is supported at its lateral edges by the frame members 34 from the horizontal longitudinally extending channels 1 and is supported intermediate the lateral edges from the roof members 15, 18 and 19 of the tunnel by spacer blocks 38, which are preferably received in longitudinally extending channel members 39 secured to the top members 33 of the casing in a manner clearly illustrated in Figs. 2 to 4, 11 and 12. Inasmuch as the blocks or bricks 38 of heat insulating material are unattached either to the top members of the tunnel or the top member 33 of the casing, they offer no impediment to the relative longitudinal expansive movement of these parts.

The remainder of the space between the outer casing and the inner tunnel in the heated zone thereof, is adapted to be filled with loose refractory material which need have little or no mechanical strength, such as kieselguhr or sil-o-cel, such material being indicated by the stippling in the several figures. The interlocking flanges at joints 21, 22 and 23 above described serve to prevent this loose insulating material from penetrating into the interior of the tunnel.

*Construction and support of cooling portion of tunnel*

The remainder of the tunnel, which may be designated the cooling portion, inasmuch as it is not provided with any positive heating means, is here shown as comprising eight sections, numbered 20, 40, 41, 42, 43, 44, 45 and 46 respectively, although a greater or less number may obviously be used. These sections are preferably rigidly secured together for expansion and contraction as a unit, section 20 being anchored against longitudinal movement by providing it with a suitable bracket member 47 (Fig. 4), which embraces the stationary cross channel 4. The remaining sections and the ends of section 20 are arranged for expansive movement with respect to the supporting structure including longitudinal channels 1 and cross channels 3 and 5 by supporting such sections upon rollers 8, which as above described, are mounted in bearings formed in bracket members on the cross channels 3 and 5. This portion of the tunnel will have a relatively less expansion than will the heating section above described and thus the provisions herein made will be ample to accommodate any expansion that can take place when the lehr is in operation.

The outer casing is formed as a continuation of the outer casing of the heated portion of the tunnel above described and includes a bottom 30, sides and a top 33, as shown. The casing is continued a part at least of the distance along the cooling portion of the tunnel, whereby to restrict the rate of cooling and is preferably of gradually tapering form, so that the insulation of the tunnel is progressively diminishing in thickness toward the exit end. This diminution in thickness is shown starting near the center of section 20 and continuing to a point near the center of section 43. Obviously, however, the point for the beginning of the taper of the insulation may be differently selected. The sides and bottom of the casing throughout the cooling portion of the tunnel are supported from the inner tunnel by suitable metallic bracket members, not shown. This construction may here be advantageously used, inasmuch as it is not desired wholly to prevent or even to minimize the loss of heat from the tunnel, but rather to control such loss of heat and thus to control the temperature gradient in the ware passing through this portion of the tunnel. The top 33 of the casing in the cooling portion of the tunnel is supported in substantially the same manner as in the heating portion thereof, that is by the use of blocks 38, which, however, are of progressively less length toward the exit end of the lehr, so as to provide for the progressively diminishing thickness of insulation. This construction is clearly shown in Figs. 4, 5 and 6.

The outer casing of the cooling portion of the tunnel is preferably built up of a plurality of sheet metal plates joined together with provision for expansion in the manner described above in connection with the outer casing for the heated section of the tunnel.

*Conveying means and drive therefor*

For conveying the articles of glassware through the tunnel and out upon the sorting table at the end thereof, I preferably use a construction substantially the same as that disclosed in the patent to Hartford-Empire Co., assignee of Vergil Mulholland, No. 1,560,481, granted Nov. 3, 1925. This construction includes the use of an endless belt built up of alternate right and left-hand wound sections of helical transversely extending coils of wire, which belt is indicated diagrammatically in the drawings at 48. As shown in Figs. 2 to 7 inclusive, the belt 48 extends through the entire tunnel and is supported throughout its length and breadth directly upon the floor thereof; and as shown in Fig. 8, the belt 48 extends along a sorting table 49, so that ware which has been annealed may be removed from the belt by operators and tested and packed in any desired manner. The sorting table 49 comprises a suitable support carrying a plurality of transversely disposed rollers 50, which support the belt 48.

A suitable driving means is indicated generally at 51. This driving means will not be described in detail inasmuch as the specific form and details of the belt drive form part of the present invention. The driving means illustrated is also embodied in the disclosure of the Mulholland Patent 1,560,481, above referred to. The return strand of the belt passes from the driving means 51 around a pair of rollers arranged as illustrated clearly in Fig. 8, one of which rollers is adapted for adjustive movement longitudinally of the lehr in order to take up any slack in the return strand of the belt as may be desired. This subject matter is also embodied in the Mulholland Patent 1,560,481 and will not be further described in detail. The return strand of the belt is supported upon spaced rollers 52 disposed at intervals longitudinally of the lehr, the rollers 52 being journaled in suitable brackets depending from the lehr frame. The front end of the lehr is provided with upper and lower rollers 53 and 54 respectively around which the conveyor belt passes before entering upon its upper or active travel through the tunnel. The belt driving means 51 is also supported upon rollers 55 arranged on axes parallel with the axes of rollers 7, so that the lehr may be moved as a whole along the floor of the factory in which it is located.

Adjacent to each end of the lehr or oftener if desired, there are arranged rollers 56, one on either side of the return strand of the belt, these rollers being mounted on substantially vertical axes for guiding the belt laterally and correcting any tendency for lateral creeping of the belt which might otherwise exist, in spite of the right and left hand wound construction of the belt itself, which is designed to prevent such creeping. Suitable filler plates are arranged to overlie the lateral edges of the working strand of the belt in its passage through the tunnel and to prevent the sidemost articles thereon from contacting with the side walls of the tunnel, such plates being shown at 57.

*Front end gate construction (Figs. 2, 9 and 10)*

For constricting the entrance to the tunnel at the front or ware-receiving end, I preferably provide a front end gate construction, in some respects similar to that shown in the reissue patent, Serial No. 17,263, granted to the Hartford-Empire Co., as assignee of V. Mulholland, April 9, 1929, wherein the front end gate construction of the device there disclosed is shown in Fig. 2. In the present instance this gate comprises a lower gate and an upper gate which jointly serve to constrict the front end opening of the tunnel.

The lower gate comprises a front wall 58 and side walls or wings 59 at each side thereof, the side wings 59 cooperating with the side walls of the tunnel to define an upwardly directed opening through which ware may be inserted into the tunnel and upon the conveyor 48. The entire lower gate including the front wall 58 and side wings 59 is preferably constructed of sheet metal filled with some suitable heat insulating material, such as kieselguhr, as illustrated in section in Figs. 2 and 10. The front wall 58 is provided with an arcuate central portion, as shown at 59' in Fig. 9. The purpose of this arcuate construction is to constrict the opening at the entrance end of the tunnel as far as possible and to cooperate with a suitable mechanical stacking device, such as that shown in the British patent to the Hartford-Empire Co., No. 293,750, completely accepted in Great Britain, December 20, 1928, this device including a means for picking up bottles or other articles successively at a single point and placing them upon the lehr belt in any one of a plurality of positions disposed in arcuate arrangement about the pick-up point as a center, by a movement of such character as to clear the front wall 58. The curvature of the portion 59' of the wall 58 is preferably such as to properly cooperate with commercial stacking devices constructed along the lines disclosed in the British patent, and in particular is preferably a circular arc having as its center the pick-up point of a cooperating stacking device of the type shown in the British patent above referred to.

As shown in Fig. 9, the side wings 59 of the front gate overlie the lateral edges of the conveyor belt 48 so that articles placed thereon will be prevented from toppling off the belt laterally even if there be a tendency for such an occurrence. The side wings 59 also prevent the lateral ingress of stray currents of air into the entrance end of the tunnel by their cooperation with the side walls of the lehr tunnel.

In order to provide access for the lehr tunnel, I preferably mount the front gate so as to be movable away from the lehr and preferably so as to swing down about a horizontal transverse axis. For this purpose the front gate is shown mounted upon bracket members 60, one at each side of the front end of the lehr, the bracket members 60 being mounted for swinging movement in vertical planes preferably about the axis of the belt roller 53, although some other axis might, if desired, be chosen. Suitable stops are provided for limiting the swinging movement of the front gate in both directions including the stop members 61 (Fig. 10) for limiting the movement of the lower front gate toward operative position, and the stop members 62 for limiting its downward movement, so as to prevent the swinging gate from interfering with the conveyor belt 48 and other appurtenant mechanism. I also preferably provide suitable counterweights to facilitate the raising of the front gate to operative position. In the present instance this is done by securing the bracket members 60 to the axis 63 about which the roller 53 is freely rotatable and by securing also to the axis 63 a pair of arms 64 extending radially therefrom and provided with counterweights 65 adjustable therealong and adapted to be clamped in adjusted positions by the set screws 66.

I also preferably provide a means for adjusting the lower front gate toward and away from the front end of the lehr and for locking such gate in adjusted position. For this purpose the gate is provided with laterally outwardly extending horizontal flanges 67 (Fig. 9) each provided with a downwardly directed rack 68 thereon with which racks are cooperable a pair of pinions 69 rigidly mounted upon a transversely extending shaft 70 rotatably mounted in the brackets 60. The shaft 70 is provided with hand wheels 71 by which it may be rotated to move the front gate toward and away from the front end of the lehr in a rectilinear path. The characteristics of this path are insured by the use of similar racks and pinions 68 and 69 at each side of the front gate. Upwardly extending bolts 72 are secured in the brackets 60 and pass through longitudinally extending openings 73 in the flanges 67 of the front gate. Suitable nuts are threaded on the bolts 72 to prevent the front gate from being dislodged from its supporting brackets.

For closing the upper portion of the entrance end of the lehr tunnel, I provide a vertically adjustable upper gate 74 which is constructed in the form clearly shown in drawings (Figs. 2 and 9) to conform generally to the configuration of the inwardly curved portion 59' of the lower gate and thus to cooperate with a stacking device such as that shown in the British patent and yet to close as large a part of the entrance end of the lehr tunnel as is possible. This upper gate 74 is preferably constructed of sheet metal, filled with loose heat insulating material as illustrated in Fig. 2 in a manner similar to the construction of the lower gate. The upper gate is mounted for vertical movement in guideways defined by the front end of the top of the lehr, the lateral sides of the lehr at the sides and vertical guide members 75 secured to the sides of the lehr tunnel all as illustrated in plan in Fig. 9. The gate 74 is provided at its upper portion with suitable anchorages shown as angle members 76 to which cables 77 (Fig. 2) are connected, the cables passing over suitable pulleys mounted in a part of the lehr framework and having fixed thereto suitable counterweights or some operating means with the aid of which the upper front gate 74 may be raised and lowered.

Thus it will be seen that by swinging down the lower front gate and raising the upper gate, complete access may be had to the entrance end of the lehr tunnel; and on the other hand, by raising the lower gate to its operative position wherein the stops 61 (Fig. 10) rest upon certain supporting structure of the lehr and by lowering the upper gate to a point such that it will just clear the tallest articles being placed on the lehr belt, and by adjusting the lower gate as near as possible to the front end of the lehr, the opening at the entrance end of the lehr is made as small as possible, thus minimizing the entrance of the stray currents into the entrance end of the lehr tunnel. It will also be seen that the position of the upper gate may be adjusted vertically to compensate for ware of different heights and also the position of the lower gate may be adjusted toward and away from the entrance end of the lehr to compensate for ware of different widths.

Exit end gate construction

I preferably provide the exit end of the tunnel with a back door or gate 78, similar to that shown in the Mulholland Patent 1,560,481 above referred to, which gate is hinged at its upper edge to the top of the last section 46 of the tunnel and which is provided with arcuate side flanges 79. The back door or gate may be opened sufficiently to permit ware to pass therebeneath and maintained at such height by a bar 80 pivoted thereto, which is adapted to be adjustably secured to a bracket 81 carried by the top member of tunnel section 46. In practice the back door or gate is preferably kept closed as far as possible in view of the height of the articles being annealed.

II.—FRONT END HEATING OR COOLING ARRANGEMENT AND CONTROL

In order to provide for the preconditioning of glassware placed on the belt at the entrance end of the tunnel and to bring all parts of such ware to approximately the "soaking" temperature, I provide a means located in the tunnel adjacent to the entrance end thereof, and preferably in the first section of the tunnel by which heat may be supplied to or abstracted from the ware passing through this portion of the tunnel prior to the ware being exposed to annealing temperatures in subsequent portions of the tunnel. This means includes muffle flues positioned in heat transferring relation with the glassware on the conveying means and preferably includes a flue built in the floor of the tunnel immediately below such means and also a flue built in the roof of the tunnel above the path of ware. In order either to heat or cool the ware as may be necessary, I provide means for causing a cooling medium to pass through the flues above and below the ware in a predetermined desired proportion, and alternatively I provide means for the supplying of heat to the interior of these muffle flues, which heat is in turn transmitted to the glassware. Thus I am enabled to control the temperature of the ware, and by properly supplying or abstracting heat thereto and therefrom respectively, I am enabled to insure the arrival of the ware at the annealing or "soaking" zone in the lehr at a desired "soaking" temperature. Also I have conceived a method of and provided automatic means for controlling the supplying or abstracting of heat to and from the ware respectively in response to ware temperatures in a peculiar and novel manner in order to accomplish the above results.

*Construction and operation of heating and cooling means (Figs. 2, 11 and 12)*

The bottom member 12 of the first section 9 is hollow and forms a flue through which cooling air may be passed for cooling the bottoms of articles on the belt 48 as desired. For this purpose the member 12 is provided with an air inlet opening 82 formed as an elongate slot extending transversely of the lehr adjacent to the entrance end thereof and on the underside of the member 12. The opening 82 communicates with the atmosphere through a zigzag passage 83 extending down through a suitable block or blocks disposed between the underside of the member 12 and the bottom 30 of the outer casing. The loose insulating material between the tunnel and outer casing is thus prevented from passing into the air inlet passage 83. The zigzag arrangement of the passage 83 provides for breaking joints in the bricks (when a plurality are used) through which this passage extends and also tends to prevent the ingress of foreign material into the flue formed in the member 12 and more particularly hinders egress of air when the flue is not operating. The member 12 is preferably partially subdivided into a plurality of sections by partial partitions, as shown at 84 (Fig. 2), which tends to keep the cooling air in close contact with the upper wall of this member, which is also the lower wall or floor of the tunnel, thus insuring the effectiveness of the cooling. For conducting the cooling air out of the interior of member 12, it is provided at the end remote from the entrance end of the lehr with laterally extending passages 85 (Fig. 12) which terminate in upwardly extending passages 86 communicating with a transverse header 87 (Fig. 2). Communication between the transverse header 87 and wind box 88 is controlled by a transversely extending damper member, which in the present case is formed of a cylindrical rod 89 having cutout segments and a suitable cylindrically formed seat for such rod. The means for controlling the position of the damper member 89 will be hereinafter described.

The upper or roof member 15 of the section 9 is hollow to form a flue, as is the bottom member 12, and is similarly provided with an air inlet opening 90 communicating with the atmosphere through a zig-zag passage 91 formed in a suitable block or heat insulating structure 92. This upper muffle flue is similar in many respects to the lower flue forming member 12 above described, but is somewhat shorter due to the front end gate arrangement as shown in detail in Fig. 2. It is furthermore desirable in most instances that the cooling at the top be less than that at the bottom due to the fact that most glass articles placed in an annealing lehr are hotter at the bottom than at the top, so that greater cooling at the bottom is required to bring all portions of such articles to the same temperature. Air is withdrawn from the interior of the member 15 through one or more upwardly extending exhaust flues 93, two such flues being shown in Fig. 12. These flues communicate at their upper ends with a transverse wind box 94. Communication between the transverse wind box 94 and the wind box 88 is controlled by a damper member 95, preferably similar in construction to the damper member 89.

Air is withdrawn from the wind box 88 through an outlet conduit 96, which communicates with the main wind box 97 for the lehr, and that in turn with a suitable suction fan 98 shown as being driven by an electric motor 99, this fan also serving for other purposes later to be described. Thus the rate of cooling of the ware adjacent to the entrance end of the lehr and within the tunnel may be accurately controlled by the position of damper members 89 and 95. Also the proportional cooling of the upper and lower portions of such ware may be controlled by the relative position of these damper members.

For supplying heat to the interior of the muffle flues in members 12 and 15, I preferably provide suitable electric heating elements, which in the present instance are shown diagrammatically at 100 and 101 in the lower flue within member 12 and at 102 and 103 in the upper flue 15. These elements preferably comprise resistance type electric heating elements and are preferably located in trays, which may be removed laterally from the bottom and top members 12 and 15 respectively. These trays including the heating elements are preferably spaced from the sides of the flues nearer the tunnel and specifically the trays including elements 102 and 103 in the upper flue within member 15 are for this purpose supported in suitable brackets similar to drawer slides, so as to space the heating elements from the underside of the top member 15, whereby to provide a passage for cooling air immediately adjacent to the side of the flue nearer the tunnel, whereby the cooling is made more effective.

Electric current is conducted to the heating elements, as shown best in Fig. 11, by relatively rigid conductors 104 leading to the outlet boxes 105 to which conductors from a suitable current source are connected. The conductors 104 have interposed intermediate their ends and embedded in the loose heat insulating material flexible members 106, whereby to permit differential expansive movements between the inner tunnel sections in which are located the electric resistance heating elements and the outer casing to which the outlet boxes 105 are attached. The members 106 may be formed of elongate bent strips of flexible heat resistant conducting material having an S-configuration, whereby ample length of conductor is provided to permit the expansion above referred to. Thus, by passing current through some or all of the heating elements 100 to 103 inclusive, heat is supplied to the interior of one or both of the relatively short muffle flues and thence to the ware on the conveyor belt adjacent to and within the entrance end of the tunnel, which will serve to bring too cool ware up to the desired "soaking" temperature prior to subjecting it to annealing temperatures in subsequent portions of the lehr.

*Automatic control for preconditioning means*

While it is feasible to provide manually operated means for controlling the positions of damper members 89 and 95 to control the draft through the upper and lower short muffle cooling flues and also to provide manually operated switches and/or current controlling means such as rheostats for the electric heating elements 100 to 103 inclusive, I prefer to employ completely automatic means for accomplishing both of these purposes in response to glass temperatures and in a peculiar and novel manner. In particular I prefer to control the alternative heating and cooling means in response to an automatic control system responsive to glass temperatures, the system being in many respects similar to that shown in my copending application, Serial No. 368,531, now Patent 1,802,991, above referred to.

In accomplishing these objects I preferably employ a construction in which damper members 89 and 95 are interconnected for simultaneous operation either to turn on or turn off the draft to both upper and lower muffle cooling flues simultaneously. For this purpose the damper members 89 and 95 are provided with sprocket wheels 107 and 108 respectively, which are angularly adjustably secured thereto in any suitable manner as by suitable set screws (see Fig. 12), these sprocket wheels being connected for simultaneous movement by a sprocket chain 109 passing therearound. For operating the two damper members, I provide on one of the shafts, as on the member 95, a crank 110 which is pivotally connected by the link 111 with a crank 112 arranged to be rotated by a motor 113. The crank 112 is preferably provided with a radial slot, to any point of which the link 111 may be pivotally connected, whereby the angular throw of the damper members 89 and 95 may be varied. This construction in combination with the adjustability of the sprockets 107 and 108, with respect to the damper members 89 and 95 to which they are adjustably fixed respectively, provides for the establishment of independently adjustable drafts in the top and bottom muffle flues respectively. The drafts in both upper and lower flues are, however, preferably turned fully on or fully off simultaneously, but the "on" position in each case is variable as to the amount of draft permitted. The effective length of the crank 112 is always less than that of the crank 110 to prevent the latter ever reaching a dead center position.

It may in some instances be desirable to use a motor for operating these damper members by rotation of the crank 112 in which a maintaining switch is used for maintaining the motor in operation during the period that the crank 112 makes one-half revolution, in combination with a cut-off switch effective to cut off the motor after this one-half revolution has been made and until a separate and independent circuit is subsequently made at which time another half revolution of the crank 112 will take place. In the present instance, I have chosen to illustrate a motor of reversible character and provided with suitable limit switches effective to prevent the rotation in one direction or the other after the crank 112 has been rotated through 180° in each direction and also in combination with a maintaining switch of any suitable character, so that even if the current to the motor to operate it in one direction or the other be cut off by the automatic means before the motor has turned the crank 112 through 180°, the motor will be maintained in operation until this 180° rotation of the crank 112 has been completed, at which time the motor will be stopped by a suitable limit switch. The maintaining switch and limit switches for the motor 113 have not been shown in the diagrammatic representation of the circuit in Fig. 2a as these are common means well known in the art and no invention is predicated upon this particular use of such means. Also in the diagram (Fig. 2a) means to prevent arcing at the contact points and chattering of the contacting member have not been specifically shown, although such means may, and preferably are used in practice in order to provide for positive making and breaking of the several circuits and to prevent "hunting". Furthermore, the circuits have been split up as far as possible to render them simple and in order that they may be easily understood.

As shown in Fig. 2a, the heating elements 100, 101, 102 and 103 are connected to line wires 114 and 115. A relay operated switch is interposed in the wire 115, which is effective to break the circuit to all of the heating elements simultaneously, the switch being generally indicated at 116 and being illustrated as a bridging member movable toward and away from the switch points to which the two portions of wire 115 are connected in response to the energization and de-energization of solenoid coil 117. When current is caused to flow through the coil 117, the bridging member of the switch 116 will be moved to bridge the gap between the portions of wire 115 and current will pass through the heating elements 100 to 103 inclusive thus supplying heat to the interior of the upper and lower muffles.

The motor 113 is shown diagrammatically and is indicated as reversible by the double ended arrow within the circle. The motor may be of the type which is provided with two field coils, one for operating it in either direction, one end of each of the field coils being connected by a common wire 118 to one side of the main line. The other ends of each of the field coils of the motor 113 may be connected by wires 119 and 120 respectively with contact points 121 and 122 positioned at relatively opposite points adjacent to the thermostatically operated contact member 123.

The other side of the main supply line used for operating the motor 113 may be connected by a wire 124 in any desired manner as through a suitable flexible pigtail to the contact member 123, whereby when the contact member is moved to the left or right, as shown in Fig. 2a, a circuit will be completed through the motor in one direction or the other as hereinafter more specifically to be described. The contact member 123 is further provided with a suitable bridging member 125 adapted to bridge the gap between contact points 126 and 127 upon movement of the contact member 123 to the right as seen in Fig. 2a. Contact point 126 is connected by a wire 128 to one side of the solenoid coil 117. Contact point 127 is connected by wire 129 to some suitable source of power here generally indicated as a battery 130, the other terminal of this source of power or battery being connected to the other side of the solenoid coil 117 by a wire 131.

The contact member 123 is adapted to be moved by a thermostat A positioned as indicated in Fig. 2 in the flue space within the lower member 12 and directly above the heating element 101, so as to be responsive jointly to the temperature within the member 12, which is affected either by the temperature of the heating elements 100 and 101 or by the draft of air passing through this member and also to some extent to the temperature of the glassware upon the conveyor 48 adjacent to the thermostat.

Thermostat A is preferably of the type disclosed in the British Patent No. 294,775 completely accepted Aug. 2, 1928 and granted to the British Hartford Fairmont Syndicate, Ltd., which comprises a differential expansion thermostat including an outer tube of relatively high expansive material, such as nickel, and a rod or inner tube of material of little or no expansivity, such as fused silica, these members being fastened together at one end being allowed to expand independently of each other, as diagrammatically illustrated in Fig. 2a. In this figure a casing 132 is shown which is preferably secured to one side of the lehr. To this casing is secured the tube 133, such as the nickel tube above referred to, and within this tube is a rod or smaller tube 134, which may be of fused silica, the tube and rod 133 and 134 being fastened together at their inner ends (to the left as seen in Fig. 2a and in a manner not here shown). These tubes 133 and 134 extend transversely of the lehr and preferably are of a length substantially the same as the width of the lehr tunnel plus the width of the insulation thereof. The details of the contact member operating mechanism are shown specifically in Figs. 19 and 20, but it will be sufficient for the description at this point to state that the member 134 bears against the slidingly mounted rod 135, which is spring pressed toward the member 134 by means of a helical compression spring 136 extending between one side of the member 132 and a collar 137 secured to the rod 135. A member 138 is threaded on the rod 135 and is provided with a stud 139 bearing against the contact member 123, which member is either flexible or pivoted at or near the box member 132. Any suitable means, such as a spring, may be used to retain the member 123 in engagement with the stud 139 and to move it to the right, as seen in Fig. 2a, when such action is permitted by the position of the stud 139. The lower end of the member 138, as shown in Fig. 2a, is slidingly received in a guide 140 which prevents its rotation. Thus when the thermostat cools off and more heat is required at the point at which the thermostat is located, the tube 133 will contract causing the member 134 to move the rod 135 to the right, as seen in Fig. 2a, against the compression of the spring 136. This will also move the stud 139 to the right, permitting the member 123 to move to the right under the influence of the spring used for causing such movement. If the thermostat is too highly heated, the reverse action will take place, and the spring 136 will cause the movement of the rod 135 to the left, which movement will be transmitted through the member 138 and stud 139 to the member 123, which will be moved to the left against the action of the spring which tends at all times to move it to the right and to retain it against the stud 139.

The operation of the system thus far described is as follows: Assuming an initial condition of the apparatus and position of parts in which the member 123 is in neutral, so that it does not contact with any of the contact points arranged adjacent thereto, the damper members 89 and 95 are in a position permitting the flow of cooling air through the upper and lower muffle flues and the current to the heating elements is off due to the fact that the switch 116 is open. If, under these circumstances, the ware is too cool and the thermostat A starts to cool off, the tube 133 will contract causing a movement of the rod 134 to the right, as seen in Fig. 2a, which as above described will cause the contact member 123 to move to the right. The first action takes place when the contact member 123 is moved to such a point that the contact spring 141 secured thereto, which is connected with the wire 124, touches the contact point 122. A circuit is completed as follows: Wire 124, contact spring 141, contact point 122, wire 120, motor 113, and wire 118, back to the line. This circuit serves to start the operation of the motor 113 in such a direction as to close the damper members 89 and 95, due to a 180° rotation of the crank 112. It will be understood that even if the movement of the contact member 123 should break the connection between contact spring 141 and contact point 122 at any time before the crank 112 has completed its half revolution, the circuit to the motor 113 to move it in the direction to close the dampers will be maintained by a suitable maintaining switch and will positively be cut off by a suitable cut-off or limit switch after the motor has rotated the crank 112 through 180°. The result of this action is that the draft will be cut off through the upper and lower muffles.

If the temperature at the thermostat A is still too cool, so that the contact member 123 is moved further to the right, as above described, the spring member 141 will yield sufficiently to permit such movement and the bridge member 125 will be moved to connect the contact points 126 and 127. A circuit will then be completed as follows: From the battery 130, through wire 129, contact point 127, bridge member 125, contact point 126, wire 128, solenoid coil 117, and wire 131, back to the battery 130. Thus, the solenoid coil 117 will be energized to close the switch 116 and connect the heating elements 100, 101, 102 and 103 with the line wires 114 and 115, which will supply heat to both the upper and lower muffles simultaneously.

When the thermostat A has been sufficiently heated, so that the tube 133 again expands and the contact member 123 starts moving to the left from its extreme right hand position as seen in Fig. 2a, under the influence of the mechanism above described, the first occurrence is the breaking of the circuit including bridging member 125 and contact points 126 and 127, which will cause the de-energization of the coil 117, this in turn causing the opening of the circuit to the heating elements 100, 101, 102 and 103 thus cutting off the further supplying of heat to the glass.

Upon further movement of the member 123 to the left as seen in Fig. 2a, due to the continued heating up of the elements of thermostat A, the contact will be broken between the spring 141 and the contact point 122. When this occurs, nothing further happens as presumably the motor 113 has ceased to operate in a direction to close the damper members 89 and 95. Even if this movement has not been completed, the action of closing the dampers will be continued and completed by the maintaining switch and cut-off switch for the motor 113, in the manner above described.

Assuming now that the thermostat A is further heated up, so that positive cooling of the glass is called for, the contact member 123 will be moved further to the left, as seen in Fig. 2a, until the contact spring 142 engages the contact point 121. At this time a circuit will be completed from the main current supply line, through wire 124, contact spring 142, contact point 121, wire 119, motor 113, and wire 118, back to the line. The motor 113 will thus be actuated in the opposite direction from that above described and will be effective to rotate the crank 112 through 180° in such opposite direction, which will serve to open the damper members 89 and 95 through the mechanism above described. It will be understood that the maintaining switch and limit switches are similarly effective to cause a continued movement of the motor sufficient to move the crank 112 through 180° and there to stop such movement. Thus the draft has again been started through the muffle flues, so that from the standpoint of the lehr, the original conditions have been restored.

If now the thermostat A commences to cool again, the contact member 123 will be moved back toward its neutral position, and in the course of such movement contact will be broken between the contact spring 142 and the contact point 121. This will have no effect upon the action of the motor 113 due to the use of the maintaining switch above described and the cut-off switch, so that this breaking of the circuit by movement of the contact member 123 to neutral will merely restore the original conditions of the automatic control means thus far explained.

With the contact member 123 in the neutral position, the heating elements are always inactive and the damper members 89 and 95 may be either open or closed to establish or cut off draft through the cooling flues within the members 12 and 15 according as the contact member 123 was to the left or right respectively of its neutral position immediately prior to its being at the neutral position.

Thus far I have described what may be termed the "primary" circuit for operating the alternative heating or cooling control. I provide also what may be termed a "secondary" circuit or a circuit for controlling the primary circuit preferably in a manner similar to that disclosed in my copending application, Serial No. 368,531 now Patent 1,802,991. It will be understood from the foregoing description that the primary circuit will control the heating or cooling in response to variations of the temperature at the position of the thermostat A from a predetermined temperature range, the range being that in which the thermostat A is adapted to operate and being in practice perhaps 2 or 3 degrees. This range, however, may be changed or varied by varying both limits thereof similarly, that is in the same direction and in corresponding amounts. In practically accomplishing this variation, I prefer to vary the relative positions of the rod 135 and member 138 by rotating the rod 135 with respect to the member 138. This is preferably accomplished automatically as in my copending application, Serial No. 368,531 now Patent 1,802,991, above referred to by means of a motor 143, which is suitably geared to the rod 135 as diagrammatically indicated in Fig. 2a, although in practice a relatively high gear reduction is used. The specific constructional details of thermostat A and of the control of the range thereof by the motor 143 are illustrated in Figs. 19 and 20 and will be later described.

For operating the motor 143 in one direction or the other I preferably employ an automatic means responsive to a thermostat A', which, as shown in Fig. 2, is located in a recess in the floor plate of section 10 at a point remote from the influence of the heating or cooling means of section 9 and also so as not to be influenced by the main heating means for the lehr, later to be described. The thermostat A' is thus adapted to be responsive solely to the temperature of the glassware adjacent thereto. Thermostat A' is preferably of the same type as thermostat A and is adapted to operate a contact member 144 in the same manner that thermostat A operates contact member 123, the essential difference being, however, that the range for thermostat A' is manually adjustable by a hand wheel 145 secured to the threaded shaft 146, which corresponds to the rod 135 of thermostat A. In connection with thermostat A' and motor 143, a cam mechanism shown in detail in Figs. 17 and 18 is preferably used, which will be described later as to its detail construction, but which, for the present purposes, comprises cams 147, 148 and 149 mounted upon a common shaft, these cams being arranged to be driven by a motor 150. Suitable speed reducing means are preferably interposed between the motor 150 and the common shaft on which cams 147, 148 and 149 are mounted, and preferably these cams are rotated at a speed, which while variable as hereinafter suggested may be of the order of one revolution in five minutes. It will be understood, however, that this speed may be changed by varying the gear train interposed between the armature of motor 150 and the common shaft on which the cams are mounted. The particular speed referred to is, however, chosen as approximately that of a single revolution of the cams in about the time it takes the ware to pass between the points opposite thermostats A and A' respectively plus the time required for heat to be transmitted from the heating elements 100, 101, 102 and 103 to the ware and from the ware to thermostat A' to influence this thermostat. The contact member 144 is preferably provided with pairs of spring contact members 151—152, 153—154, 155—156, all of which contact members 151 to 156 inclusive are in effect connected together due to the construction of the contact member 144 of some conducting material. Current is supplied to the secondary circuit from line wires 157 and 158. The wire 158 is connected by a wire 159 with the conducting contact member 144 so that each of the contact springs 151 to 156 inclusive is at all times connected to wire 158. Contact springs 151 to 156 inclusive respectively are arranged to make contact with points 160, 161, 162, 163, 164 and 165. One side of the motor 150 is connected by a wire 166 with one side of the line, wire 157; and the other side of the motor 150 is connected by a wire 167, with a wire 168, which communicates with both contact points 164 and 165 at one end and with one contact 169 of the maintaining switch controlled by cam 149 at its other end. The other contact 170 of this maintaining switch is connected directly to line wire 158. The cam 149 has a notch at one portion thereof into which the movable member 171 of the maintaining switch may drop by gravity or under the influence of a suitable spring as desired. Each of the cams 147 and 148 is provided with a protrusion, which is adapted to be opposite their respective cam followers almost immediately after the cams 147, 148 and 149 have been rotated so that the member 171 rides out of the notch in cam 149. Cam 147 controls a switch including members 172 and 173 and cam 148 controls a switch including members 174 and 175. One side of each of the switches controlled by cams 147 and 148, to wit, switch contacts 173 and 175, are connected with points 162 and 163 respectively by wires 176 and 177. The motor 143 is as above stated a reversible motor and may include two field windings, one side of each of which is connected by a common wire 178 with one side of the line 157. The other sides of each of the field windings of motor 143 are connected respectively by wires 179 and 180 with contact points 160 and 161 respectively; and the wires 179 and 180 are connected respectively by wires 181 and 182 to the other sides of the switches controlled by cams 147 and 148, that is switch contacts 172 and 174 respectively.

Considering now the operation of the secondary circuit as controlling the motor 143 to adjust the range of the primary circuit, and starting with the contact member 144 in neutral, so that no contacts are made on either side thereof, the motor 150 is stopped in a position in which the cam follower 171 of the maintaining switch is in the notch in cam 149, and the protrusions on cams 147 and 148 are not opposite their respective cam followers, so that the switches including members 172—173 and 174—175 are both open, and assuming that the glass is cooling down, so that the temperature at the point at which thermostat A' is located is falling below the predetermined set range for this thermostat, which will result in a movement of the contact member 144 to the right, as seen in Fig. 2a. The first occurrence incident to the movement of contact member 144 to the right is that the contact spring 154 will engage contact point 163, which will connect the wire 158, through wire 159, contact member 144, contact spring 154, contact point 163, and wire 177 with the switch point 175; but inasmuch as this switch is open at this point, no action will occur.

Upon further movement of the contact member 144 to the right as seen in Fig. 2a, due to the continued cooling of the thermostat A', the next contact to be made is that between the contact spring 156 and contact point 165. At this time a circuit is completed as follows: From one side of the line, wire 158, through wire 159, contact member 144, contact spring 156, contact point 165, wire 168, wire 167, motor 150 and wire 166 back to the other side of the line, wire 157. This will start the operation of the motor 150 to rotate the cams 147, 148 and 149 in the direction of the arrows shown in Fig. 2a. As soon as contact member 171 has been moved by the movement of the cam 149 to close the maintaining switch between contacts 169 and 170, a maintained circuit through the motor 150 is completed as follows: From the line wire 158, through contact 170, contact 169, a part of wire 168, wire 167, motor 150, and wire 166 back to the other side of the line, wire 157. This circuit will maintain the motor 150 in operation until the cams have made a complete revolution to bring the notch in cam 149 opposite the cam follower 171, whether or not the contact is broken between contact spring 156 and contact point 165 to open the motor circuit as first established.

Also, as soon as the cams 147, 148 and 149 have commenced to rotate, the follower of cam 148 rides up on the protrusion of that cam, causing the engagement of switch contacts 174 and 175, which will complete a circuit through the motor 143 to operate it in one direction as follows: starting with one side of the line, wire 158, through wire 159, contact member 144, contact spring 154, contact point 163, wire 177, contact 175, contact 174, wire 182, wire 180, motor 143, and wire 178 back to the other side of the line, wire 157. The motor 143 will thus be actuated in one direction as long as the contact points 174 and 175 are retained in engagement, which time will be subject to the configuration of cam 148, and which will be measured also by the rate of rotation of the cam under the influence of motor 150. The configuration of cams 147 and 148 are variable as hereinafter set forth in the specific description thereof given in connection with Figs. 17 and 18. This actuation of the motor 143 will be of an intermittent character and will be only for the predetermined variable time during a single rotation of cam 148. This will cause but a small correction in the range of thermostat A due to a small variation between the temperature of the ware adjacent to the thermostat A' and the predetermined range of that thermostat. If this small variation continues in approximately the same degree, when the cams have made a single rotation, the motor 150 will be maintained in operation due to contact spring 156 and contact point 165 being still in engagement and the small correction of the range of thermostat A by motor 143, controlled by cam 148 will be repeated. Furthermore, this small correction will be repeated as long as the above conditions exist. If, however, the correction on the first or some subsequent revolution of the cams 147, 148 and 149 furnishes a sufficient correction of the range of thermostat A, the contact member 144 will return to its neutral position and the motor 150 will stop after the cams have completed a complete revolution, as above described. The timing of the intermittent range corrections above described and operated by motor 150 is designed to be such that the cams will make a single revolution in the time ware passes between thermostats A and A' plus the time for heat to be transmitted from the heating elements 100, 101, 102 and 103 to the ware and therefrom to thermostat A', so that if the initial correction is sufficient, no further correction will be made until the ware acted upon by the preconditioning means as corrected has time to influence thermostat A'.

If, however, the variation between the temperature of the ware and the set range of thermostat A' is relatively larger in degree, so that the contact member 144 is moved still further to the right, as shown in Fig. 2a, contact spring 152 will engage contact point 161, which will complete a continuous circuit to the motor 143 for the time contact spring 152 and contact point 161 remain in engagement. This continuous circuit may be traced out beginning with one side of the line, wire 158, through wire 159, contact member 144, contact spring 152, contact point 161, a portion of wire 182, wire 180, motor 143, and wire 178 back to the other side of the line, wire 157. Thus the correction of the range of thermostat A effected by the motor 143 will be continuous as long as the contact spring 152 remains in engagement with contact point 161.

Assuming now that the contact member 144 is in its extreme right hand position, as seen in Fig. 2a, and contact springs 152, 154 and 156 are all engaged with their respective contact points 161, 163 and 165. If now the correction of thermostat A made as above described is sufficient, and the ware is sufficiently heated, so that thermostat A' is influenced by the heated ware and commences to move the contact member 144 toward the left from its extreme right hand position, the first action occurs when the contact spring 152 breaks contact with its point 161. At this time the continuous operation of the motor 143 is brought to an end and the motor may be operated solely under the intermittent operated means, including the cam 148 and the switch controlled thereby.

Upon further movement of the contact member 144 to the left, contact spring 156 will break from its contact point 165, thus opening the circuit through the motor 150 other than that maintained by the maintaining switch including cam 149, but having no effect upon the intermittent operation of the motor 143, which at this time is controlled solely by the switch responsive to cam 148. Under these circumstances, however, the cams 147, 148 and 149 will be stopped as soon as the motor 150 has moved them to such a point that the cam follower 171 drops into the notch in cam 149.

Upon further movement of the contact member 144 to the left, as seen in Fig. 2a, contact spring 154 will break from its corresponding contact point 163, which will open the circuit through the motor 143, whether or not the hump or protrusion on cam 148 is in or out of alignment with its follower. However, if in this event, the three cams have not ceased rotating, the rotation for the single revolution will be completed by the motor 150 under the control of the maintaining switch including cam 149. The contact member 144 has now assumed neutral position and the original position is regained.

If, however, the glass is still too hot and the contact member 144 continues to be moved to the left, as seen in Fig. 2a, from the neutral position, the first occurrence is the engagement of contact spring 153 with contact point 162, which as above described with respect to the engagement of contact spring 154, with contact point 163, will have no effect, due in this case, however, to the fact that the switch, including contacts 172 and 173 are out of engagement.

Upon further movement of the contact member 144 to the left, as seen in Fig. 2a, the motor 150 will be started in the same manner and in the same direction as above described in connection with the engagement of contact spring 156 and contact point 165 and also it will be maintained in operation by the maintaining switch including cam 149 in exactly the same manner.

In this case, however, and shortly after the cams 147, 148 and 149 have been set in rotation, the motor 143 will be operated intermittently for short but variable periods in the opposite direction, in the same manner as above described in connection with the use of cam 148. The circuit for this intermittent operation in the opposite direction may be traced out as follows: starting from one side of the line, wire 158, through wire 159, contact member 144, contact spring 153, contact point 162, wire 176, switch contact 173, switch contact 172, wire 181, wire 179, motor 143, and wire 178 back to the other side of the line, wire 157. Thus the motor will be operated intermittently in the opposite direction, but in a corresponding manner to that above described.

Upon further movement of the contact strip 144 to the left, as seen in Fig. 2a, contact spring 151 will engage contact point 160, completing a continuous circuit through the motor 143 in the same direction as its intermittent rotation, which has just been described, the circuit here being traceable as follows: starting from one side of the line, wire 158, through wire 159, contact member 144, contact spring 151, contact point 160, wire 179, motor 143, and wire 178 back to the other side of the line, wire 157.

This continuous operation of the motor 143 is exactly analogous to that above described except that it is in the opposite direction.

The return of the contact member 144 from its extreme left-hand position back to neutral is accompanied by operations corresponding to those described above in connection with its return from its extreme right hand position back to neutral.

*Details—cam switches and maintaining switch (Figs. 17 and 18)*

The mechanism including the cams 147, 148 and 149, the motor 150 and the associated gearing, etc., is all adapted to be enclosed within a casing 183, which is preferably secured to some fixed part of the apparatus or to a suitable support adjacent thereto. For example, an instrument board may be secured to the lehr structure and be used as a support for the several control switches and other electrical apparatus used in connection with the lehr, such instrument board not being shown in the drawings. The box or casing 183 is provided with a suitable cover 184, which may be secured to the box in any desired manner and which is removable to permit access to the mechanism within the casing. To the interior of the box is secured a supporting plate 185 preferably by means of bolts 186 or in any other desired manner. To the plate 185 is secured the supporting member 187 upon which the several switches are mounted, one of these switches being shown in detail in Fig. 18, the switches corresponding with the arrangement diagrammatically shown in Fig. 2a. The motor 150 is also supported from the plate 185 and supporting member 187. The gear train later to be described and the shaft 188 upon which the cams 147, 148 and 149 are mounted are journaled in suitable bearings in the supporting plates and members. The motor 150 preferably includes a speed reducing mechanism of any suitable type enclosed within a casing 189, which serves to impart rotary motion from the motor to the pinion 190. The pinion 190 meshes with a gear 191 rigidly secured to a short shaft 192, which also carries a gear 193 meshing with a gear 194 secured to the shaft 188. Thus the motor 150 will be effective to rotate the cam shaft 188 through the gear train above described.

Cams 147, 148 and 149 are shown in the positions which they preferably occupy in the device as used in practice. Cam 149 is, however, angularly adjustably secured to shaft 148 in any suitable manner, as by means of a set screw 195. Cams 147 and 148 are each built up of two relatively adjustable cam members 147a—147b and 148a—148b respectively. Taking up cam 147 for example and understanding that cam 148 is constructed in exactly the same manner, this cam (147) is made up of two independently angularly adjustable cams 147a and 147b each of which is securable to the shaft 188 at any desired angular position, as by means of set screws 196 and 197. Each of the cams 147a and 147b is provided with a projecting portion or hump, such as that shown in Fig. 18 at 198 in connection with one portion 148a of cam 148. If the two sections, 147a and 147b, be relatively rotated, the effective length of the protrusion or hump may be varied at will, thus variably to control the time of operation of the motor 143 upon each complete revolution of the shaft 188 and of the cams fixed thereto. In this way the time of such intermittent operation of the motor 143 may be varied at will. The arrangement and construction of the switches are clearly shown in Fig. 18 as is also the connections of the several wires thereto, the switch contact members and the wires leading thereto being given the same numbers as in Fig. 2a.

Details—primary thermostat A and associated mechanism

The details of the primary thermostat A, the switches operated thereby and the adjusting means therefor are shown in Figs. 19 and 20. In these figures the thermostatic elements 133 and 134 are indicated as is also the threaded rod 135 against which the thermostatic element 134 abuts. The threaded rod 135 is pushed upwardly, as shown in the plan view (Fig. 19) to retain it always in contact with the thermostatic element 134 by the compression spring 136 extending between a fixed abutment and a collar 137 secured to the rod 135. Threaded on the rod 135 is the member 138, which is retained against rotative movement while permitting it to move longitudinally of and with the member 135 by providing at the right hand side thereof as seen in Fig. 19 a groove indicated in dotted lines at 199 into which projects a pin shown in dotted lines at 200, the pin 200 and grooves 199 thus having the same functions as the guide 140 shown in Fig. 2a. An adjustable abutment member 139 is threaded through a portion of the member 138 and contacts with one side of the contact member 123, which is urged against this abutment member 139 by the tension spring 201 extending between the contact member 123 and a suitable fixed anchorage 202. The arrangement of the contact member 123 and the contacts thereof are preferably as illustrated in Figs. 19 and 20. There is illustrated in these figures two extra contact points, one on either side of the contact member 123, which may be used for any desired purpose, but which are not used in carrying out the circuit illustrated in the diagram Fig. 2a, and will therefore not be described in detail.

The motor 143 for adjusting the range of the thermostat A is shown in Fig. 20 wherein this motor is shown provided with a pinion 203 which is adapted to rotate the screw rod 135 through the intermediate gear 204 and the gear 205 on the rod 135. As here shown, the gear 204 is elongated in a direction parallel to its axis, so as to be in mesh with a gear 205, in all positions of that gear, which positions are varied by the position of the thermostat. Any suitable speed reducing gear may be used between the motor 143 and the shaft or threaded rod 135, and that shown is merely by way of example.

As shown, the entire mechanism is enclosed within a suitable casing 206 which is adapted to be secured to the side wall of the outer casing of the lehr, as for example the side plate 32 shown in Fig. 12, the purpose of this casing 206 being merely to prevent the ingress of dirt and other foreign matter into the automatic control means.

III—MAIN HEAT PROVISIONS FOR LEHR AND CONTROL THEREOF

For providing the main heat supply to the lehr, I preferably employ electric heating elements of substantially the same general type as those above described for preheating the glass and similarly disposed within closed muffles. As shown in Figs. 3 and 3a, the main heating provision for the lehr beneath the tunnel thereof comprises heating elements disposed respectively in four closed muffles, two of which are disposed in each of the bottom members 16 and 17 of each of sections 10 and 11 respectively, the heating elements being designated by reference characters 207, 208, 209 and 210.

These heating elements have a predetermined heating capacity and are adapted to be connected in parallel or series across a line, as may be desired, but as shown in Fig. 3a, elements 207 and 208 are in series with each other as also are elements 209 and 210, while elements 207 and 208 are together connected in parallel with elements 209 and 210. Current is supplied to the heating elements 207 to 210 from main line wires 211 and 212, a suitable switch being interposed in this instance between the points 213 and 214 in one side of the line to the heating elements for turning the current on or off as may be desired. I further contemplate the use of a suitable rheostat or current regulating device if desired, but in the present embodiment no such device is shown. I prefer also to control the current to the heating elements by thermostatic means in response to the temperature of the glass at a predetermined point in the tunnel. For this purpose I prefer to employ a thermostat B of the same type as that used in connection with the preheating, that is thermostat A', having a manually adjustable range to control the current passing through the solenoid coil 216 of the switch 215 and operating to energize the coil 216 when the glass is too cold and more heat is required. As above described in connection with the thermostats A and A' shown in Fig. 2a, upon the thermostat B cooling off to a greater extent than that desired in response to a temperature variation between the temperature at the thermostat B and the predetermined range at which it is set to operate, the contact member 217 will be moved to the right as seen in Fig. 3a, so that the bridging contact 218 will engage contact points 219 and 220, which will complete a circuit from the source of power here indicated as the battery 221, through wire 222, contact point 220, bridging member 218, contact point 219, wire 223, solenoid coil 216, and wire 224, back to the battery or source of power 221. This will energize the solenoid coil 216 and close the switch 215 to turn on current to the heating elements 207, 208, 209 and 210.

A corresponding series of heating elements which may or may not have the same heating characteristics as elements 207, 208, 209 and 210, is used in connection with the top members 18 and 19 of sections 10 and 11 of the lehr, the elements being similarly disposed in muffles. These elements are designated by the reference characters 225, 226, 227 and 228 and are connected preferably in the manner as shown with line wires 211 and 212 from which they are adapted to be supplied with current under the control of a switch generally indicated 229 and including a bridging member for connecting contact points 230 and 231. Switch 229 is adapted to be operated by a thermostat C, of the same type as thermostats A' and B, located as indicated in Fig. 3, by means of a solenoid. Upon the thermostat C being exposed to a temperature lower than that of the predetermined range thereof, the contact member 232 of the thermostat C will be moved to the right in the same manner as that described in connection with the other thermostats and will bring the bridging contact 232' into engagement with contact points 233 and 234 positioned adjacent thereto. A circuit will then be closed as follows: From the source of power here indicated as a battery 235, through a wire 236, contact point 233, bridging member 232', contact point 234, wire 237, solenoid coil 238, and wire 239, back to the source of power or battery 235.

The range at which the thermostats B and C operate may be independently adjusted by the hand wheels 240 and 241 respectively, the adjustment being similar to that described above in connection with thermostats A and A'. The heating of the glass in the lehr tunnel by the main heating means will be controlled in response to the temperature primarily of the glass in a portion of the heated zone, the upper end lower systems being independent of each other but serving together properly to condition the glass and to subject it to the desired "soaking" temperature. Also by suitable differential adjustment of the thermostats B and C by hand wheels 240 and 241, a desired vertical temperature gradient may be obtained in the tunnel to provide differential conditioning of various portions of articles for purposes outlined above.

IV—Cooling System for the Lehr

Lower cooling flue and draft control therefor

For controlling the cooling of the glassware as it passes through the lehr, I prefer to employ in part a muffle cooling flue 242 extending longitudinally of the lehr tunnel and disposed beneath the belt 48 upon which glassware is carried through the lehr, the upper side of this cooling flue serving as the bottom of the tunnel and serving to support the belt 48. This flue preferably is divided into a plurality of independent parallel flues, as shown in Figs. 13 and 14, the number of such independent flues being a matter of selection, three being shown in the present instance. The flue 242 is open to the atmosphere at the exit end of the lehr, as shown at 243, (Fig. 8), atmospheric air being drawn into the flue 242 at this point. As shown in Figs. 4 and 5, the flue has a smaller cross sectional area in the hotter portions of the tunnel than in the cooler portions thereof, so as to restrict the cooling at such portions by restricting the amount of cooling air which passes therethrough. As here shown, the decrease in cross sectional area of the flue 242 is a stepped one commencing near the center of section 41 of the lehr tunnel as indicated at 244, although it may be desirable in some cases to provide a flue having a progressively smaller cross sectional area or a reduction in area in several steps. Cooling air is withdrawn from the flue 242 at spaced intervals through the passages 245, 246, 247 and 248, it being understood that these passages extend the full width of the flue 242 and communicate with each of the several sections thereof in the event that a divided flue is used, as shown in Figs. 13 and 14. The amount of air withdrawn through each of the take-off passages 245 to 248 inclusive, is controlled by dampers of any desired type, for example, one having openings registerable with openings in a fixed plate as shown at 249 in connection with the take-off passage 245, Figs. 6 and 13. Similar dampers are preferably employed at 250, 251 and 252, in connection with take-off passages 246, 247 and 248 respectively.

The take-off passages 245, 246, 247 and 248 all communicate at their lower ends with a longitudinally extending take-off conduit 253, which communicates with a transversely extending wind box 254 (Fig. 6). Wind box 254 in turn communicates through saddle pipes 255 and 256 with the main wind box 97, and that in turn with the main suction fan 98. Communication between the take-off conduit 253 and the wind box 254 is controlled by a suitable damper, such as the butterfly damper 257 (Figs. 6 and 13). This damper 257 controls the total amount of air passing through the cooling flue 242. The temperature gradient of the ware in the cooling zone may be further and independently adjusted by the proportionate amounts of the cooling air withdrawn from the cooling flue 242 by each of the take-off passages 245, 246, 247 and 248, the control being effected by dampers 249, 250, 251 and 252, which are adapted to be manually operated and which preferably are fixed in a predetermined selected position in the initial adjustment of the lehr and thereafter are not changed as to position, so that the entire regulation of the cooling is controlled during the normal operation of the lehr by the single damper 257, as to the lower cooling flue 242.

Upper cooling flue and draft control therefor

I prefer also to employ an upper cooling flue 258 extending longitudinally of the lehr tunnel opposite the lower cooling flue 242, and specifically forming a large part of the roof of the lehr tunnel. This upper flue 258 is preferably divided into a plurality of similar flues, as shown in Figs. 13 and 14, in the same manner as is the lower cooling flue 242 and differs from that flue chiefly in that it is provided in the lehr sections 45 and 46, as indicated in Figs. 7 and 8, with a corrugated or ribbed lower wall, the corrugations or ribs extending longitudinally of the lehr tunnel. The flue 258 is open to the atmosphere at the exit end of the tunnel, as indicated at 259 and provided with a plurality of take-off passages 260, 261, 262 and 263, flow through which are preferably controlled by dampers 264, 265, 266 and 267 respectively, preferably of the same type as the damper 249 which is shown in detail in Fig. 13, damper 264 being shown in detail in Fig. 13 in the same manner as is the damper 249.

The take-off passages 260, 261, 262 and 263 serve to conduct the cooling medium away from the flue 258 to a longitudinally extending take-off conduit 268, which communicates with the main wind box 97, and that in turn, with the fan 98, whereby all of the air drawn into the upper flue 258 at its entrance end 259 will be withdrawn through the take-off conduit 268 by the fan 98. Communication between the take-off conduit 268 and the wind box 97 is controlled by a suitable damper, preferably of the butterfly type, as shown at 269 (Fig. 6). Thus the total flow of cooling air through the upper flue 258 is controlled by the position of damper 269, and the proportionate flow in the several parts of the flue 258 is controlled by the position of the dampers 264, 265, 266 and 267 in the take-off flues 260, 261, 262 and 263 respectively. As in the case of the lower flue 242, the upper flue is preferably arranged and designed to provide different cross sectional areas in the different parts thereof, the reduction here being at the point 270 in Fig. 5. Also like the lower flue 242, it is contemplated that the upper flue 258 may be either progressively reduced in area, or a plurality of reducing steps may be used. The take-off conduits 253 and 268 are preferably increased in area progressively or in steps from their ends toward the entrance end of the lehr tunnel to their opposite ends, whereby to assist in the progressive removal of cooling air from the cooling flues 242 and 258.

While it is within the purview of this invention to operate dampers 257 and 269 individually and independently, it is preferred that they be interconnected for simultaneous operation, which is accomplished by the means shown in Figs. 6 and 13 in which the shaft to which each of these dampers is secured is provided with a sprocket wheel secured thereto, and a sprocket chain is passed around these wheels. As shown the shaft 271 to which damper 257 is secured is provided with a sprocket wheel 272, which may be angularly adjustably secured thereto in any suitable manner, as by means of a set screw (not shown). Similarly the shaft 273 to which the damper 269 is secured is provided with a sprocket wheel 274 which is also angularly adjustable around the shaft and securable thereto in any desired angularly adjusted position. A sprocket chain 275 passes around sprocket wheels 272 and 274 and as shown also passes around a sprocket 276 which is adapted to be rotated by a suitable motor 277, it being desired to control these dampers automatically as well as simultaneously by a single control. This motor 277 is preferably reversible and is controlled by automatic means and the electric circuit shown in detail in Fig. 4a in response to the temperature of the glass at a predetermined point in the tunnel. Preferably also the motor is provided with suitable limit switches by which it is stopped after the dampers have been turned through an angle of 90° in either direction, the ratio of the sprocket 276 to the sprockets 272 and 274 being 1:2, so that the motor is arranged to operate sprocket 276 through an angle of 180° in either direction before it is stopped by the limit switch for that direction. Inasmuch as the use of limit switches for this and other analogous purposes is well known, no illustration in the electrical circuit diagram is made of such switches.

*Automatic means for cooling control (Fig. 4a)*

While any desired means may be used for operating the motor 277 to control the positions of the dampers 257 and 269, I prefer to use a means such as is shown diagrammatically in Fig. 4a including an electrical circuit system by which the motor 277 is controlled by a thermostat D in response to the temperature of the glass, the thermostat being located as shown in Fig. 4. This thermostat D is preferably of the same type as thermostats A', B and C and extends transversely of the tunnel in a suitable recess in the floor thereof, as shown. Thermostat D is positioned at some distance beyond the first point at which the glassware is subject to the cooling action of the cooling flues 242 and 258, so that the control of the glass temperature by the cooling flues may be reflected in the temperature to which the thermostat is subjected, whereby the regulation will more closely approximate that required for proper cooling of the glassware. At the same time from a comparison of Figs. 1 and 1a, it will be noted that the position of the thermostat D is closely adjacent to the point at which it is desired to increase the rate of cooling of the glassware, namely, the low annealing point or point below which permanent strains cannot be reintroduced into the ware. It is also to be noted that the position of the thermostat D as shown from the comparison of Figs. 1 and 1a, is slightly to the left of or toward the entrance end of the tunnel from this point.

The thermostat D is provided with a contact member 278, which is in turn provided with a pair of interconnected contact springs 279 and 280, one on each side of the member 278, a contact spring member 281, and a rigid contact member 282. The contact spring 279 is adapted to engage and bridge contact points 283 and 284 by movement of the contact member 278 to the left, as seen in Fig. 4a, and the contact spring 280 is adapted similarly to engage and bridge the contact points 285 and 286 upon movement of the contact member 278 to the right. Contact spring 281 is adapted to engage and bridge contact points 287 and 288 upon movement of the contact member 278 to the right. Contact member 282 shown at the upper end of the contact member 278 is adapted to contact with either of the points 289 or 290 upon movement of the contact member 278 to its extreme left or right hand positions respectively, all as seen in Fig. 4a. A reversing switch is used for controlling the direction of operation of the motor 277. This switch comprises a bridging member 291 adapted normally to engage and connect points 292 and 293, but when moved by the operation of its associated solenoid, the bridging member 291 is adapted to engage and connect points 294 and 295. The solenoid for operating the reversing switch includes a solenoid coil 296, one terminal of which is connected to the point 287 by a wire 297 and the other terminal of which is connected by a wire 298 to one terminal of a suitable source of power, here indicated as a battery 299, the other terminal of which is connected by a wire 300 to the contact point 288. A main switch is used in connection with this circuit including a bridging member 301 adapted when moved by its associated solenoid to engage and bridge contact points 302 and 303. Power for the operation of the motor 277 is derived from main line wires 304 and 305. As shown, a wire 306 connects the line wire 304 with the contact point 302. A wire 307 connects contact point 303 with contact points 295 and 293. The solenoid for operating the main switch, including the bridging member 301, is actuated by a coil 308, one terminal of which is connected by a wire 309 with both the contact points 283 and 285. The other terminal of the coil 308 is connected by a wire 310 with one terminal of a suitable source of power, here shown as the battery 311, the other terminal of which is connected by a wire 312 with the contact points 284 and 286.

I prefer to use in connection with the cooling control means and a method for correcting the rate of cooling intermittently for small variations between the temperature of the glass adjacent to the thermostat D and the set range for this thermostat, and to effect a continuous correction when such variations are larger. For this purpose I employ a motor 313 arranged to rotate cam 314 for controlling the intermittent operation, and a circuit in some ways analogous to the secondary circuit described in connection with Fig. 2a, but employing somewhat different arrangements of wires, it being understood that either of the circuits shown in Figs. 2a or 4a or any other circuit effective to produce the same or similar results are within the purview of my invention. In connection with the motor 313, I preferably use a maintaining switch including the cam 315, which is constructed in a manner similar to that described above in connection with cam 149. Preferably also the cam 314 is constructed so as to provide a protrusion variable in length, as described above in connection with the cam 147 in describing Figs. 17 and 18, whereby the duration of the intermittent operations of the motor 277 may be varied at will. Cams 314 and 315 are preferably on a single shaft 313$^a$, which is rotated through suitable gearing from the motor 313.

The connections including the intermittent and continuous means for operating the motor 277 include the following: a wire 316 extending from one side of the line, wire 305, to one side of the motor 313, a wire 317 extending from the other side of the motor 313 to the wire 307, a wire 318 from the wire 317 to one contact 319 of the maintaining switch controlled by cam 315, a wire 320 from the other contact 321 of the maintaining switch to the other side of the main line, wire 304, a wire 322 from the line wire 305 to one contact 323 of the switch for controlling the intermittent operation of the motor 277, and a wire 324 from the other contact 325 of the last named switch and connected to a wire 326 which connects the common point of the two field windings of the reversible motor 277 with the contact points 289 and 290. It will be understood in this connection that any suitable reversible motor 277 may be used, preferably one having a common wire used for one side of the line for operating the motor in either direction and two wires for the other side of the line, one for operating the motor in each direction. These last two wires leading to the motor are shown at 327 and 328 and are connected respectively with contact points 294 and 292 of the reversing switch. The wire 329 communicates between the wire 322 and the contact member 282 of the contact member 278, this connection being made in any suitable manner as by a flexible pigtail.

The mode of operation of the mechanism and the several circuits shown in Fig. 4a may be described starting with the contact member 278 in the neutral position, at which time the bridging member 291 of the reversing switch will be in its normal position engaging contact points 292 and 293; the main switch including bridging member 301 will be open so that contacts 302 and 303 will be unconnected; the cam 315 will be in such a position that the cam follower will be in the notch thereof and the maintaining switch including contact members 319 and 321 will be open; the cam follower of cam 314 will be on a low point on the cam, but the high point will be ready to close the switch upon the initial movement of the cam 314 in the direction of the arrow (Fig. 4a); and the motors 313 and 277 will not be in motion.

Assuming now that the glass is too cool, so that the contact member 278 is moved to the right by the thermostat D in the same manner as that particularly described in connection with thermostat A. In this event, however, what is called for is not the supplying of heat, but the cutting down of the cooling by the closing, to some extent at least, of dampers 257 and 269. The first action which takes place is the engagement of contact spring 281 with contact points 287 and 288, which will energize the solenoid 296 of the reversing switch by the completion of the circuit as follows: Starting with the battery or source of current 299, through wire 300, contact point 288, contact spring 281, contact point 287, wire 297, solenoid coil 296, and wire 298 back to the other side of the battery or source of current 299. The bridging member 291 will be moved by its solenoid to engage contact points 294 and 295. No further action takes place at this time, however, as the main switch, including the bridging member 301 is still open and motors 313 and 277 are not actuated.

On further movement of the contact member 278 to the right, as seen in Fig. 4a, due to the thermostat D being too cool, the contact spring 280 will engage contact points 285 and 286, which will close the main switch by completing a circuit as follows: from the source of current or battery 311, through wire 310, solenoid coil 308 of the main switch, wire 309, contact point 285, contact spring 280, contact point 286, and wire 312 back to the source of current or battery 311.

This energization of the solenoid of the main switch will cause the bridging member 301 to engage contact points 302 and 303, which will first start the operation of the cam motor 313 by completing a circuit as follows: from one side of the line, wire 304, through wire 306, contact point 302, bridging member 301, contact point 303, wire 307, wire 317, motor 313 and wire 316, back to the other side of the line, wire 305. This actuation of the motor 313 will start the cams 314 and 315 rotating in the direction of their respective arrows, which will cause the cam follower of cam 315 to ride out of the notch in its associated cam and will cause the engagement of contacts 319 and 321 of the maintaining switch, which will maintain the motor 313 in operation through a circuit as follows: from one side of the line, wire 304, through wire 320, maintaining switch points 321 and 319, wire 318, a part of wire 317, motor 313, and wire 316 back to the other side of the line, wire 305. Thus the motor 313 will be maintained in operation for a complete revolution of the cams 314 and 315, whether or not the circuit initially closed by the closing of the main switch be opened before the completion of the revolution of the cams 314 and 315.

As soon as the protrusion of the cam 314 is moved under the cam follower, so as to close the switch including contacts 325 and 323, a circuit through the motor 277 will be completed as follows: starting with one side of the line, wire 304, through wire 306, contact point 302, bridging member 301 of the main switch, the contact point 303, wire 307, contact point 295 of the reversing switch, bridging member 291, contact point 294, wire 327, the motor 277, a portion of the wire 326, wire 324, contact points 325 and 323 of the cam controlled switch and wire 322 back to the other side of the line, wire 305. This will maintain the motor 277 in operation in the proper direction to move the dampers 257 and 269 toward their closed position for a short period of time, determined by the adjusted length of the protrusion of cam 314, which as above explained in connection with cam 147 shown in Fig. 17, may be adjustable. After the motor 277 has been stopped by the breaking of the circuit between the points 325 and 323, it will not operate further unless the correction has been insufficient and conditions require still less cooling, so that the contact member 278 will maintain the cam motor 313 in operation after it has completed its first revolution under the action of the maintaining switch, meanwhile time has been provided for the change made to take effect and for the thermostat to respond to the conditions as changed. As long as the contact member 278 is retained in a position to keep the main switch closed, the motor 313 will continue to operate, and the motor 277 will be intermittently operated to effect intermittent progressive correction of the rate of cooling. If, however, one or more of such intermittent corrections is sufficient to correct the rate of cooling, so that the thermostat D responds to such cutting down of the rate of cooling and returns to its normal position, the motor 313 will be stopped at the end of any complete revolution of the cams 314 and 315 and the correction of the cooling rate will then be stopped, due to the fact that the main switch including bridging member 301 will have been opened.

If, however, the variation between the glass temperature adjacent to the thermostat D and the set range of that thermostat is of relatively greater magnitude than that previously assumed, so that the thermostat D is much too cool, the contact member 278 will be moved to its extreme right hand position (Fig. 4a), which will bring contact member 282 into engagement with contact point 290. This will complete a continuous circuit through the motor 277 by shunting the intermittent controlling switch including members 325 and 323. The continuous circuit completed at this time will be as follows: starting with one side of the line, wire 304, through wire 306, contact point 302, bridging member 301, contact point 303, wire 307, contact point 295, bridging member 291, contact point 294, wire 327, motor 277, wire 326, contact point 290, contact member 282, wire 329, and a part of wire 322 back to the other side of the main line, wire 305. This continuous correcting action of the motor 277 will take place as long as the contact member 282 is in engagement with contact point 290, thus effecting relatively rapid correction of the rate of cooling in response to relatively large call for such correction.

Assuming now that the thermostat D has moved the contact member 278 to the extreme right hand position, as seen in Fig. 4a, and is starting the movement of the strip to the left in response to sufficient heat in the glass, that is, the contact member is moving back toward its neutral position. The first occurrence is the breaking of the continuous motor operating circuit between contact member 282 and contact point 290, which will stop the continuous operation of motor 277 and allow it to be operated intermittently solely under the action of the cam controlled switch, including contacts 325 and 323, as above described.

Further movement of the contact member 278 toward neutral position (toward the left as seen in Fig. 4a) will cause a breaking of the circuit between bridge member 280 and the contact points 285 and 286. This will open the circuit through the solenoid coil 308, which will permit the main switch to open, breaking the continuous circuit through the motor 313 which was first established, and breaking circuits through the motor 277, whether or not the cams 314 and 315 have ceased to rotate and whether or not the intermittent cam controlled switch, including members 325 and 323, is closed. The motor 313 still will continue to operate until the follower for cam 315 drops into the notch in the cam and opens the maintaining switch at the end of a complete revolution of the cams.

Upon still further movement of the contact member 278 back toward neutral position, the contact spring 281 will be moved out of engagement with contact points 287 and 288, which will de-energize the solenoid coil 296 of the reversing switch and permit the bridging member 291 thereof to assume its normal position engaging contact points 292 and 293 for the operation of the motor 277 in a direction opposite to that just described.

If greater cooling is now required, the contact member 278 will be moved further to the left by the thermostat D, but as the reversing switch is normally in position for operating the motor in the reverse direction from that just described, it is unnecessary to energize the solenoid of this switch, and therefore there is no contact opposite contact spring 281 and contact points 287 and 288.

The first occurrence upon movement of the contact strip 278 to the left of its neutral position is the engagement between contact spring 279 and contact points 283 and 284, which will be seen to have exactly the same result as in the case of the contact between contact spring 280 and contact points 285 and 286, namely, the energization of the solenoid coil 308 to close the main switch, including bridging member 301 and contact points 302 and 303. This will start the motor 313 operating; and such operation will be continued after it has been started by the maintaining switch including cam 315 in the same manner as above described. The only difference in this case, however, is that the motor 277 will be rotated in the opposite direction. The circuit for the intermittent operation of motor 277 in this last direction may be traced as follows: starting from one side of the line, wire 304, through wire 306, contact point 302, bridging member 301, contact point 303, wire 307, contact point 293, bridging member 291, contact point 292, wire 328, motor 277, a portion of wire 326, wire 324, the intermittent control switch contacts 325 and 323, and wire 322 back to the other side of the line, wire 305.

The intermittent operation of the motor 277 is exactly the same in both directions except for the position of the reversing switch and the difference in the circuits as above set forth.

The continuous operation of the motor 277 in this last direction is caused by further movement of the contact member 278 to its extreme left hand position, as seen in Fig. 4a, in which contact member 282 engages contact point 289 and completes the continuous circuit for the motor 277 in a manner similar to the continuous operation of this motor in the opposite direction but with the variation due to the different position of the reversing switch.

The occurrences upon the return of the contact member 278 to its neutral position will include first, the breaking of the points between contact members 282 and 289 to stop the continuous operation of the motor 277 and permit its operation only intermittently under the control of the cam 314, and subsequently the de-energization of the solenoid coil 308 by the breaking of its circuit between contact spring 279 on the contact member 278 and points 283 and 284, which will stop the operation of the motor 277 and merely permit the motor 313 to complete a single revolution of the cams 314 and 315 under the control of the maintaining switch.

Thus it will be seen that the correction of the rate of cooling either to increase or decrease the cooling may be made in response to the temperature of the ware at a predetermined point and that small variations between the temperature of the ware and the set range of the thermostat D will have the result of producing intermittent corrections of the rate of cooling; and larger variations, continuous correction of the rate of cooling.

In the temperature preconditioning section of the tunnel in section 9, and also in the high temperature regions thereof including sections 10 and 11, I have provided for the establishment of a vertical temperature gradient, whereby to permit the subjection of different parts of glass articles being annealed to different temperature environments. In the cooling portion of the tunnel this differential temperature conditioning of the ware may be accomplished by the setting of dampers 257 and 269 at different points with respect to each other by angularly adjusting one or both their operating sprockets about the shafts upon which these dampers are fixed. I can also make certain other, and to some extent subsidiary adjustments to effect a desired vertical temperature gradient at selected zones in the tunnel, by the positioning of the dampers in the take-off passages 260, 261, 262 and 263 of the upper flue 258 with respect to each other and to the positioning of the dampers in the take-off passages 245, 246, 247 and 248 of the lower flue 242. I prefer to adjust the rate of cooling to approximately that at which the heat will be abstracted from glass articles substantially in proportion to the thickness of the walls thereof, for example, an article having a relatively thick bottom and relatively thin side walls is preferably cooled at such a rate that all parts of the article are maintained at substantially the same temperature. For this purpose the bottom must be cooled at a rate faster than the sides, so that the amount of heat abstracted from the bottom will be sufficient to bring its temperature down at the same rate as the rate of reduction of temperature of the side walls.

I also contemplate the use of vertical controlled temperature gradients in combination with horizontal controlled temperature gradients for effecting differential cooling of different parts of articles, the better to prepare them for use for particular purposes, for example, hot filling, as above described.

All of these special annealing methods are possible in my improved lehr herein described and are considered to be within the purview of my invention.

V—DRIFT CONTROL MECHANISM, OPERATING MEANS AND METHOD

In my prior application, Serial No. 389,118, filed August 29, 1929, now Patent 1,802,192, I have disclosed certain basic principles and structure for controlling drift in tunnel lehrs which are also embodied in the present application in some detail, and as to the common subject matter, the present application is a continuation of my prior copending application. The present application does, however, include certain additional features and refinements of the drift control means and of the method claimed in my prior copending application, which improvements are hereinafter claimed.

Summarizing briefly the general arrangements of the drift control of my copending application, now Patent 1,808,192, which are incorporated in the structure shown in the present application, there is included a means in the cooling portion of the tunnel for supplying air or other gaseous medium thereto, which will cause a superatmospheric pressure at and adjacent to this portion of the tunnel and will tend to cause a flow of the medium in both directions from the point of admission of such air or other gaseous medium. This effect is counterbalanced by the withdrawing of gaseous medium from the tunnel at a point between the point of admission above described and the exit end of the tunnel in such quantity that the flow in either direction between the point of admission of the gaseous medium to the tunnel and the entrance end thereof is controlled or minimized, and if desired, may be reduced to zero. By a suitable manual control of the relative rates of admission of gaseous medium or air to the tunnel and the rate of withdrawing of such medium from the tunnel as above described, a desired balance can be established between these two rates and the pressures set up thereby within the tunnel in co-ordination with the atmospheric pressure at each end thereof which might tend to set up a drift in either direction through the tunnel, but I prefer to control the rates of inlet and outlet of the gaseous medium by automatic means. In my prior copending application now Patent 1,808,192 above referred to, such means are shown as including a differential thermostat positioned above and adapted to be acted upon by a flame of relatively small dimensions and without appreciable force, which flame is influenced and blown in one direction or the other longitudinally of the lehr by any drift which may exist therein. The flame is caused by such drifts to heat one side of the differential thermostat to a greater extent than the other and thus to cause it to make an electrical contact at one side or the other, which serves through suitable connections to control a reversible motor; and that in turn, to control the rate of inflow or outflow of the gaseous medium into and out of the tunnel.

This subject matter has been incorporated in the lehr shown in the present application, but in addition I have illustrated a means whereby the air introduced into the tunnel is given a dynamic impulse in a direction toward the entrance end thereof, which dynamic force must be overcome by an additional section at the withdrawal point. The additional suction is thus effective to draw in an additional amount of air through the exit end of the tunnel, which serves to increase the rate of cooling of the glassware between the withdrawal point and the exit end of the tunnel. This means and the method of using a glass annealing tunnel in this manner are not disclosed in my copending application now Patent 1,808,192 and are a part of the present invention.

Also my prior copending application, now Patent 1,808,192, shows but a single withdrawal point, so that all the air drawn into the exit end of the tunnel passes out at this point as also does the air supplied to the tunnel by the drift control means. In the present application I have shown a plurality of such withdrawal points arranged in a peculiar and novel manner in order better to effect the cooling of the glassware, which means is also a part of the present invention.

*Details of air introducing means for tunnel*

Referring to Figs. 6, 14, 15 and 16, I have shown a preferred means for introducing air into the tunnel, the air preferably being the heated air, which has been withdrawn from the cooling flues and which has thus acquired a certain amount of heat from the cooling of the glassware. This air is withdrawn from the downstream side of the fan 98 by the interposition of a deflecting damper 330 in the air outlet passage therefrom, the damper 330 being secured to a shaft 331, as shown in Figs. 6 and 14, and serving to deflect a portion of the air from the fan 98 into the transversely arranged wind box 332. Downtake passages 333 are provided at each side of the tunnel for conducting the heated air from the wind box 332 to a pair of air heating chambers 334, one disposed along each side of the tunnel. These chambers 334 are for the purpose of further heating the air, which is to be introduced into the tunnel from the glass being cooled in the tunnel and are separated from the tunnel only by thin plates of good heat conducting material, such as sheet metal, as clearly shown at 335 in Figs. 14, 15 and 16. As illustrated best in Figs. 15 and 16, the air is introduced to the tunnel at each side thereof at directly opposite points through openings 336 in which are disposed a plurality of vertical curved vanes 337 for the purpose of deflecting the air introduced into the tunnel toward the entrance end thereof. The end 338 of the chamber 334 may also be curved in a manner to assist in deflecting the introduced air in this direction. The air introduced into the tunnel is thus given a dynamic force in a direction toward the entrance end of the tunnel.

*Means for withdrawing air from the tunnel (Figs. 7 and 15)*

For withdrawing air from the tunnel, I preferably provide a plurality of groups of outlet openings, as best shown in Figs. 7 and 15, which in the present instance are in the bottom of section 45 of the tunnel, these openings communicating between the interior of the tunnel and the lower cooling flue 242.

As shown, there are three groups of openings, which are disposed at spaced intervals longitudinally of the tunnel and include groups 339, 340 and 341. It is to be noted that the openings of group 341 are more numerous and are in effect equivalent to an opening of a greater cross-sectional area than are the openings of groups 339 and 340. It is to be understood that any desired number of openings or groups of openings preferably arranged at spaced intervals along the tunnel and preferably of progressively increasing effective cross sectional area toward the exit end thereof may be used. The purpose of this arrangement is to provide for a progressive withdrawal of the cooling air which is drawn into the exit end of the tunnel in the manner above described, which in turn provides for progressive cooling of the ware in substantially the desired manner, the number and cross section of the several openings of the several groups being chosen with respect to the rate of cooling desired.

Furthermore, the openings of the several groups are disposed adjacent to the center of the transverse dimension of the lehr tunnel and extend toward the sides thereof but are not located at the extreme sidemost portions; and also the openings of group 341 are nearer the sides than are the openings of groups 339 and 340. The purpose of this arrangement is to insure that the cooling air drawn into the exit end of the lehr will pass between the articles of glassware on the conveyor belt 48 and will serve primarily to cool the glass and thus tend to minimize the currents of air between the sidemost articles on the conveyor belt and the lateral sides of the lehr tunnel which would be relatively ineffective for cooling the ware.

I have also provided in the lower flue 242 a damper 342 disposed between the open end 243 of this flue and the nearest of the inlet openings of group 341. This damper will regulate the proportion of the air passing along flue 242 which is drawn into this flue through the open end 243, and the complementary proportion which is withdrawn from the interior of the tunnel through the groups of openings 239, 240 and 241.

Due to the fact that the fan shown at 98 is used both to force air into the tunnel and to draw the same air out of the tunnel in connection with drift control, and also is used to draw the air through the cooling flues 242 and 258 and through the preliminary cooling flues within members 12 and 13, shown in Fig. 2, it is desirable that the load on this fan be minimized as far as possible in order to permit the smallest size fan to be used, which is capable of accomplishing the necessary air circulation. I prefer therefor, to control the position of dampers 330 and 342 in such a manner that their effect will be cumulative, whereby the drift may be controlled by a minimum load on the fan. For this purpose the damper 342 is secured upon a transversely extending shaft 343 to which is preferably adjustably secured a sprocket wheel 344. A similar sprocket wheel 345 is preferably adjustably secured to the shaft 331 to which damper 330 is secured, these sprockets being connected by a sprocket chain 346 for simultaneous operation. Thus when damper 330 is moved toward closed position to reduce the amount of air diverted from the downstream side of the fan into the tunnel, the damper 342 is likewise moved toward closed position to increase the proportion of the air passing through the cooling flue 242, which is withdrawn from the tunnel. The effects of these adjustments are therefore cumulative in controlling the drift in the tunnel.

While it may in some cases be feasible to control the positions of these dampers 330 and 342 manually, I prefer to control them automatically by a reversible motor 347 (Figs. 6 and 6a). This motor is preferably geared down on a suitable ratio, for example 1 to 3, between the operating sprocket thereof about which the chain 346 passes and the sprockets 345 and 344. Suitable limit switches are also preferably used, as in the case of motor 277, for stopping the motor after it has rotated its sprocket through a desired angle, for example 180°, and the dampers 330 and 342 through an angle of 60°. If a different ratio between the motor sprocket and those on the dampers be used, the limit switches may be set to a correspondingly different point. Here again, inasmuch as limit switches are so well known in the art, it has been thought unnecessary to illustrate them in connection with the wiring diagram shown in Fig. 6a.

*Automatic drift control means and circuit therefor*

As in my copending application, Serial No. 389,118, now Patent 1,808,192, above referred to, of which the present case is a continuation, I prefer to control the operation of the motor 347 by a flame and differential thermostat control means, which flame is responsive to the drift in the tunnel. For this purpose a shallow bay 348 (Figs. 6 and 15) is formed in the tunnel in which the flame and differential thermostat are located. This bay is preferably spaced toward the entrance end of the lehr from the air admission openings 336 such a distance that the eddying effect of the air admission will have no effect upon the flame, which will be solely responsive to drift through the hotter portions of the tunnel. For the purpose of insuring uniformity in any currents which may exist in the tunnel so that the flame will be effected only by true drift, a corresponding bay 349 is formed in the side of the tunnel opposite the bay 348. A gas burner 350 for directing a flame of small dimensions preferably in an upward direction is located in the bay 348. Disposed above the gas burner and adapted to be acted upon by it is a differential thermostat designated generally at 351. This thermostat includes a pair of heat conducting side wings 352 and 353 which are connected to independent parallel expansive members 354 and 355 (Fig. 6a), the members 354 and 355 being secured together at their opposite ends but being separated from one another intermediate their ends by an air space, whereby as the ends of these members 354 and 355 within the tunnel are rigidly fixed to a suitable bracket, the expansion of one to a greater amount than the other, due to the flame being deflected in one direction or the other longitudinally of the lehr, will cause their ends outside the tunnel to move in one direction or the other. For example, if there is a drift from left to right, as seen in Figs. 6 and 6a, the flame from the burner 350 will heat the heat conducting members 353 and 355 to a greater extent than members 352 and 354, which will cause the outer end 356 of the thermostat to move to the left, as seen in Fig. 6a, and cause the bridging contact member 357 thereof to engage contact points 358 and 359. Correspondingly a drift in the opposite direction, namely, from right to left as seen in Figs. 6 and 6a, will cause the bridging contact member 360 to engage contact points 361 and 362.

The reversible motor 347 is preferably of a type similar to the reversible motors 277 and 143 and comprises two field windings, one for operating the rotor of the motor in each direction, one end of each of these windings being connected by common wire 363 with one side of the main current supply line wire 364, and the other side of the respective windings of motor 347 being connected by wires 365 and 366 with switch contact points 367 and 368 respectively. The other side of the main line, wire 369, is connected by wires 370 and 371 with switch contact points 372 and 373 respectively. A pair of solenoid operated relay switches including bridging members 374 and 375 are adapted to make contact between points 372-367 and 368-373 respectively. The bridging member 374 of one solenoid operated relay switch is adapted to be moved to engage its associated contact points by the energization of the solenoid coil 376, one terminal of which is connected by the wire 377 with contact point 359 and the other terminal of which is connected by wire 378 with one terminal of the battery or other source of power 379, the other terminal of which is connected by a wire 380 with the contact point 358. The bridging member 375 of the other solenoid operated relay switch is adapted to be moved to engage its associated contact points by the energization of the solenoid coil 381, one terminal of which is connected by the wire 382 with the contact point 362 and the other terminal of which is connected by a wire 383 with one terminal of a suitable battery or other source of power 384, the other terminal of which is connected by a wire 385 with the contact point 361.

Assuming now that the drift is from left to right through the tunnel as seen in Figs. 6 and 6a, which will move the contact member 357 into engagement with contact points 358 and 359 as above described. The solenoid 376 will be energized by a circuit which may be traced as follows: starting with the source of power or battery 379, through wire 380, contact point 358, bridging member 357, contact point 359, wire 377, solenoid coil 376, and wire 378 back to the battery or source of power 379. This will move the bridging member 374 to engage switch contact points 372 and 367, which will complete a circuit through the motor 347 to operate it in one direction, as follows: starting with the line wire 364, through wire 363, motor 347, wire 365, contact point 367, bridging member 374, contact point 372 and wire 370 back to the other side of the line, wire 369. The motor 347 will thus be operated slowly due to the high gear reduction associated therewith to correct the position of dampers 330 and 342 as long as the differential thermostat keeps the solenoid coil 376 energized. As soon as the solenoid coil 376 is de-energized by movement of the differential thermostat back to its neutral position, the circuit through the motor 347 will be opened and the motor stopped.

If now the differential thermostat 351 is moved in the opposite direction, due to a drift from right to left through the tunnel as seen in Figs. 6 and 6a, the solenoid coil 381 will be correspondingly energized by a circuit commencing with the battery or source of power 384 and going through wire 383 solenoid coil 381, wire 382, contact point 362, bridging member 360, contact point 361, and wire 385, back to the battery or source of power 384. This will move the bridging member 375 to connect contact points 368 and 373, which will actuate the motor 347 in the opposite direction by completing a circuit from one side of the line, wire 364, through wire 363, motor 347, wire 366, contact point 368, bridging member 375, contact point 373, and wire 371 back to the other side of the line, wire 369.

Obviously, therefore, the drift will be accurately controlled in response to the differential thermostat as effected by the movement of the flame from burner 350.

In the event that the flame from the burner 350 should accidently be extinguished, I preferably provide a means for cutting off the supply of gas to this burner, including a thermostatic element, indicated generally at 386 (Fig. 6), of any well-known type, and a circuit of well-known character including a solenoid operated valve (not shown) in the gas line to burner 350, which valve will be retained open as long as the thermostatic element 386 is heated by the heat of the burner, and which will be automatically closed by a spring or other suitable means if the thermostat 386 moves in response to the flame from the burner 350 being extinguished. In connection with this safety cut-off valve, a suitable short circuiting device may be used for opening the valve in the gas line to burner 350 and holding it open while the burner is being lighted and the thermostat 386 being heated to an extent sufficient to hold the valve open automatically. Inasmuch as this subject matter is well known in the burner art, no specific illustration is given nor is any claim made thereto herein.

While I have shown and described but one embodiment each of the several instrumentalities assisting in the construction, use and automatic operation of the lehr disclosed herein, it is contemplated that many of the individual features herein disclosed both of structure and method may be used independently in other combinations, and I do not wish to be limited therefore except by the scope of the appended claims, which are to be construed as broadly as the state of the prior art permits.

I claim:

1. A lehr for annealing glassware, comprising an elongate tunnel, means for moving articles of glassware therethrough, means positioned adjacent to the entrance end of and within said tunnel for alternatively supplying heat to or abstracting heat from the ware on said moving means, and means for selectively and automatically controlling the supplying and abstracting of heat to and from the ware by the aforesaid means to insure the presentation of the ware at a point within said tunnel beyond the second named means at a predetermined temperature irrespective of its temperature when placed on said moving means.

2. A lehr for annealing glassware comprising an elongate tunnel, means for moving articles of glassware therethrough means positioned adjacent to the entrance end of and within said tunnel for alternatively supplying heat to or abstracting heat from the ware on said moving means, means for selectively and automatically controlling the heat supplying and abstracting means in response to variations of the temperature from a given temperature range at one point, and means for automatically varying the range at the aforesaid point in response to temperature conditions at a second point.

3. A lehr for annealing glassware, comprising an elongate tunnel, means for moving articles of glassware therethrough means positioned adjacent to the entrance end of and within said tunnel for alternatively supplying heat to or abstracting heat from the ware on said moving means, means for selectively and automatically controlling the supplying and abstracting of heat to and from the ware on said moving means, including a temperature responsive device located at a predetermined point adjacent to the path of travel of the ware and effective in response to variations in its temperature from a selected temperature range, means for automatically changing the limits of the range in response to variations of the temperature of the ware at a subsequent point in the travel thereof, and manual means for variably selecting the temperatures at which said last named means acts to vary said range.

4. A lehr for annealing glassware, comprising an elongated tunnel, means for moving articles of glassware therethrough, means for cooling the ware in said tunnel including longitudinally extending cooling flues associated with the floor and the roof of said tunnel respectively, means to cause a cooling medium to flow through each of said flues, means to control the flow of the cooling medium through each of said flues, and a common means for simultaneously controlling the control means for both of said flues, whereby the rate of cooling of the upper and lower portions of the glassware will be proportioned in a predetermined ratio.

5. A lehr for annealing glassware, comprising an elongate tunnel, means for moving articles of glassware therethrough, means for cooling the ware in said tunnel including longitudinally extending cooling flues associated with the floor and the roof of said tunnel respectively, means to cause a cooling medium to flow through each of said flues, a damper associated with each of said flues to control the total flow therethrough, means interconnecting said dampers for simultaneous operation, and means for varying the relative position of one of said dampers with respect to said interconnecting means, whereby to vary the relative rates of cooling of the several portions of the glassware by said flues respectively.

6. A lehr for annealing glassware, comprising an elongate tunnel, means for moving articles of glassware therethrough, means for cooling the ware in said tunnel including longitudinally extending cooling flues associated with the floor and the roof of said tunnel respectively, means to cause a cooling medium to flow through each of said flues, means to control the total flow of cooling medium through each of said flues, a common means for simultaneously controlling the last named means, and means to control the cooling gradient in one of said flues by controlling the proportion of the total flow passing through contiguous zones thereof.

7. A lehr for annealing glassware, comprising an elongate tunnel, means for moving articles of glassware therethrough, and means for cooling the ware in said tunnel, the last named means including longitudinally extending cooling flues associated with the floor and the roof of said tunnel respectively, means to cause a cooling medium to flow through each of said flues, means to control the total flow of cooling medium through each of said flues, a common means for simultaneously controlling the last named means, said flues being divided into a plurality of contiguous controllable cooling zones, and independent means to control the proportion of the total flow of each flue passing through the several contiguous zones thereof to effect a progressive change in the rate of cooling of the glassware, whereby the cooling of the glassware will be proportioned in a predetermined ratio between the upper and lower portions thereof and whereby the temperature gradient in the various portions of the ware passing through the cooling zone in said tunnel is regulable as desired.

8. A lehr for annealing glassware, comprising an elongate tunnel, means for moving articles of glassware therethrough, and means for cooling the ware in said tunnel, the last named means including longitudinally extending cooling flues associated with the floor and the roof of said tunnel respectively, means to cause a cooling medium to flow through each of said flues, means disposed at correspondingly spaced intervals along each of said flues for withdrawing independently controllable proportions of the cooling medium therefrom, a damper associated with each of said flues to control the total flow of cooling medium passing therethrough, means interconnecting said dampers for simultaneous operation, a single means for operating both of said dampers simultaneously to control the total flow through both of said flues, and means for varying the relative position of each of said dampers with respect to said interconnecting means, whereby the temperature gradient in each flue is independently controllable and whereby cooling of the glassware is apportionable as desired between the upper and lower portions thereof.

9. A lehr for annealing glassware, comprising an elongate tunnel, means for moving articles of glassware therethrough, and means for cooling the ware in said tunnel, the last named means including longitudinally extending cooling flues associated with the floor and the roof of said tunnel respectively, means to cause a cooling medium to flow through each of said flues, means to control the flow of the cooling medium through each of said flues, a reversible electric motor connected with both the last named means for operating them simultaneously, a thermostat positioned so as to be responsive to the temperature of the glassware at a predetermined point in said tunnel, and means including electric circuits associated with said thermostat for operating said motor in one direction or the other in response to variations in the temperature of the ware adjacent to said thermostat from a predetermined temperature range in one direction or the other respectively.

10. A lehr for annealing glassware, comprising an elongate tunnel, means for moving articles of glassware therethrough, a longitudinally extending cooling flue associated with said tunnel, said flue being open to the atmosphere at the exit end of said tunnel, a fan for drawing cooling air into and through said flue in a direction opposite to the direction of movement of the ware through said tunnel, means to divert a portion of the air from the downstream side of said fan into said tunnel at a point spaced from the exit end thereof, a passage communicating between the interior of said tunnel and said flue at a point between the exit end of said tunnel and the point of admission of air from said fan, a damper in said flue between its point of communication with said passage and the entrance to said flue at the exit end of said tunnel, a damper effective to control the amount of air diverted from the downstream side of said fan into said tunnel, and means connecting both said dampers for simultaneous operation, whereby when the first named damper is moved toward closed position to increase the proportion of the air passing through said flue which is drawn from the interior of said tunnel, the other named damper is likewise moved toward closed position to decrease the amount of air diverted from the downstream side of said fan into said tunnel, whereby said dampers are cumulative in their effects in controlling the balance between the air admitted to said tunnel and that withdrawn therefrom for controlling the drift through that portion of said tunnel between the entrance end thereof and the point at which air is admitted thereto.

11. A lehr for annealing glassware, comprising an elongate tunnel, means for moving articles of glassware therethrough a longitudinally extending cooling flue associated with said tunnel, said flue being open to the atmosphere at the exit end of said tunnel, a fan for drawing cooling air into and through said flue in a direction opposite to the direction of movement of the ware through said tunnel, means to divert a portion of the air from the downstream side of said fan into said tunnel at a point spaced from the exit end thereof, a passage communicating between the interior of said tunnel and said flue at a point between the exit end of said tunnel and the point of admission of air from said fan, a damper in said flue between its point of communication with said passage and the entrance of said flue at the exit end of said tunnel, a damper effective to control the amount of air diverted from the downstream side of said fan into said tunnel, means connecting both said dampers for simultaneous operation to increase the proportion of the air passing through said flue which is drawn from the interior of said tunnel when the other named damper is moved toward closed position to decrease the amount of air diverted from the downstream side of said fan into said tunnel, whereby said dampers are cumulative in their effects in controlling the balance between the air admitted to said tunnel and that withdrawn for controlling the drift through that portion of said tunnel between the entrance end thereof and the point at which air is admitted thereto, and means for controlling the positions of both dampers simultaneously and automatically in response to the drift through the hotter portion of said tunnel.

12. A lehr for annealing glassware, comprising an elongated tunnel, means for continuously moving articles of glassware therethrough, a longitudinally extending cooling flue associated with said tunnel and open to the atmosphere adjacent to the exit end of said tunnel, means for causing a flow of air through said flue in a direction opposite to that of the movement of ware through said tunnel, and means for controlling the total flow of air through said flue in response to variations between the temperature of the glass and a predetermined manually variable temperature range at a predetermined point in said tunnel, said point being located intermediate the ends of said flue, whereby the temperature of ware effective to control the temperature at said point is controlled at least to some extent by the flow of air through said flue.

13. The method of annealing glassware, which comprises concomitantly subjecting selected portions of the articles of glassware to selected different temperature environments, and thereafter maintaining independently selected temperature gradients for said portions of the articles, whereby a predetermined rate of cooling of the articles will produce in the walls of the articles as finally cooled a predetermined desired condition of strain.

14. The method of annealing articles of glassware having walls of different mean thicknesses, which comprises subjecting the walls of said articles to such different temperature environments that the rates of extraction of heat from the several walls of the article will be substantially proportional respectively to the thicknesses of the several walls and that all portions of the articles are maintained at a substantially uniform temperature at any given time, whereby a relatively high rate of extraction of heat from the articles will have no tendency to rupture them at the junctions of the said walls.

15. The method of annealing articles of glassware having walls of different mean thicknesses, which comprises the steps of maintaining all portions of the articles at a predetermined relatively high soaking temperature for a time sufficient to release all permanent strains from the walls thereof and to bring all portions of the articles to substantially the same temperature, and cooling the articles in a manner such that the average temperature of the several walls is maintained substantially the same by abstracting heat at a faster rate from the thicker walls than from the thinner walls substantially in proportion to the heat content of the several walls respectively, whereby rapid cooling will have no tendency to rupture the articles at the junctions of thick and thin walls.

16. The method of annealing hollow glass articles having relatively thick bottoms and relatively thin side walls, comprising the steps of removing substantially all permanent strains from all the walls of such articles and bringing all portions thereof to substantially the same temperature by subjecting the articles to a predetermined maintained soaking temperature for a substantial predetermined length of time, cooling the articles by extracting the heat from the bottoms of such articles at a rate faster than the rate of extraction of heat from the sides thereof substantially in the proportion of the ratio of the mean thickness of the bottoms to the mean thickness of the sides while maintaining the bottom and sides of the articles at substantially the same temperature at any given time, whereby the sides and bottoms of the articles will rigidify at substantially the same time, whereby danger of rupture of the articles at the junctions of the sides and bottoms is minimized.

HAROLD A. WADMAN.